United States Patent
Lim

(10) Patent No.: US 6,430,640 B1
(45) Date of Patent: Aug. 6, 2002

(54) SELF-ARBITRATING, SELF-GRANTING RESOURCE ACCESS

(75) Inventor: Whai Lim, Pacific Palisades, CA (US)

(73) Assignee: Virtual Resources Communications, Inc., Torrance, CA (US)

( * ) Notice: Subject to any disclaimer, the term of this patent is extended or adjusted under 35 U.S.C. 154(b) by 0 days.

(21) Appl. No.: 09/370,462

(22) Filed: Aug. 9, 1999

Related U.S. Application Data

(63) Continuation-in-part of application No. 09/046,801, filed on Mar. 23, 1998, which is a continuation of application No. 08/813,109, filed on Mar. 7, 1997, now Pat. No. 5,765,036.

(51) Int. Cl.$^7$ .............................................. G06F 12/00
(52) U.S. Cl. ...................... 710/200; 710/241; 710/242; 710/243; 710/244
(58) Field of Search .............................. 710/220, 200, 710/240, 241, 242, 243, 244

(56) References Cited

U.S. PATENT DOCUMENTS

| | | | | | |
|---|---|---|---|---|---|
| 5,377,331 A | * | 12/1994 | Drerup et al. | .............. | 710/113 |
| 5,410,654 A | * | 4/1995 | Foster et al. | ................ | 395/275 |
| 5,506,972 A | * | 4/1996 | Heath et al. | ................ | 710/113 |
| 5,765,036 A | * | 6/1998 | Lim | ........................... | 710/305 |
| 5,941,968 A | * | 8/1999 | Mergard et al. | ............ | 710/128 |
| 6,003,097 A | * | 12/1999 | Richman et al. | ............... | 710/8 |
| 6,339,807 B1 | * | 1/2002 | Yasue | ......................... | 710/240 |

OTHER PUBLICATIONS

"The image retrieval prototype," *Data Communications*, p. 48, Sep. 21, 1994.

* cited by examiner

Primary Examiner—Peter Wong
Assistant Examiner—Tim Vo
(74) Attorney, Agent, or Firm—Lyon & Lyon LLP

(57) ABSTRACT

An arbitration system and method provides self-arbitration among a plurality of processors or other entities vying for access to the bus or other shared resource. The entities vying for access to the shared resource present their respective priority values to an evaluation medium. The evaluation medium determines the highest priority value of those values presented, and provides this "winning" value to the competing entities. The entities compare the received "winning" value to their respective presented values. If an entity makes a positive comparison, that entity won the arbitration and is granted access to the shared resource.

39 Claims, 15 Drawing Sheets

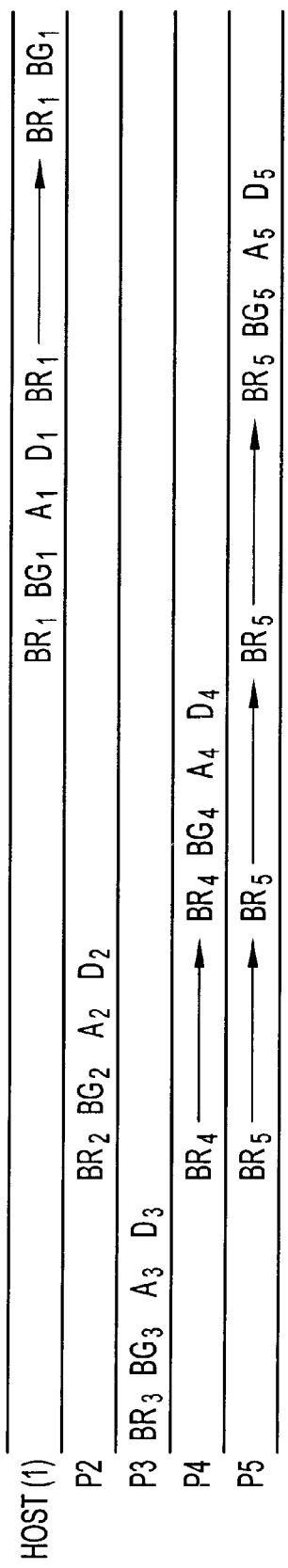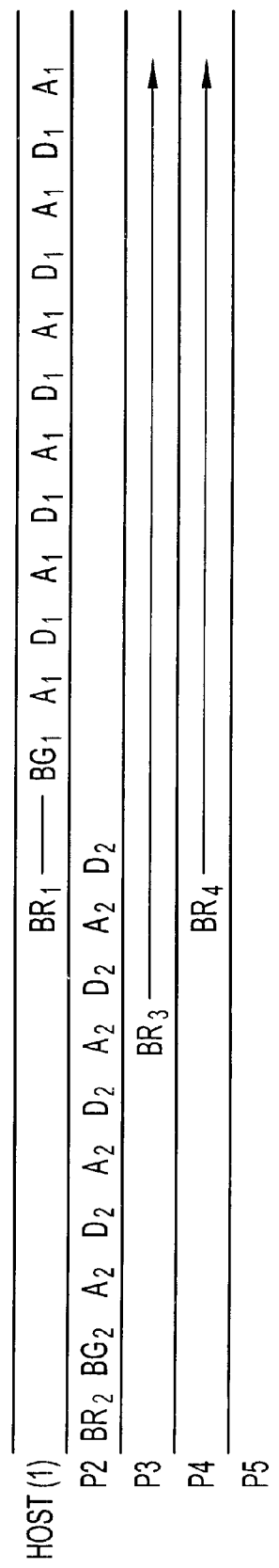
FIG. 6
FIG. 7

SELF-ARBITRATING, SELF-GRANTING RESOURCE ACCESS

This application is a continuation-in-part of patent application Ser. No. 09/046,801 filed Mar. 23, 1998, which is a continuation of patent application Ser. No. 08/813,109 filed Mar. 7, 1997 now U.S. Pat. No. 5,765,036, which are incorporated herein by reference. This application is related to co-pending U.S. patent application Ser. No. 09/370,463, titled "System and Method for Determining Priority on the Fly for Multi-Resource Arbitration Systems."

TECHNICAL FIELD OF THE INVENTION

The present invention pertains, in general, to shared resources, and more particularly to a system and method for arbitrating access to a shared resource among a plurality of entities.

BACKGROUND OF THE INVENTION

Contemporary computing and communication systems often utilize one or more shared resources in an effort to streamline the system. Examples of shared resources can include a shared bus or other communications channels, shared peripherals, shared memory, and so on. Depending on the nature of the shared resource and the system in which it is implemented, different techniques can be employed to manage the use of that resource among the various system entities. For example, where multiple computers or workstations share one or more common printers, printer queues can be established such that when print jobs are received, they are queued and handled in order. As another example, Ethernet® and other network protocols provide features such as collision detection and packet retransmission to allow multiple computing systems to share the common network.

In other scenarios it is not desired or not practical to share resources in this manner. For example, many bus architectures do not provide collision detection and retransmission features. Instead, these architectures rely on schemes referred to as bus arbitration to determine which of a plurality of processors or other entities are granted access to the bus. In most instances, arbitration is performed among the competing entities to determine which entity will get exclusive access to the bus or other resource for an upcoming time slot.

SUMMARY OF THE INVENTION

One aspect of the invention, comprises a shared memory system that includes a centrally located memory. The shared memory can have a plurality of storage locations, each for storing data of a finite data size as a block of data. The block of data is accessible by an address associated with the storage location for that block of data. In one embodiment, the centrally located memory is controlled by a memory access control device. In one embodiment, the centrally located memory is physically provided in a centralized location. In an alternative embodiment, the centrally located memory can be physically distributed among one or more entities, while having common addressing. In this manner, even though the memory is physically distributed, the common addressing provides a memory that is centralized virtually, if not physically. In either embodiment, the memory is referred to as centrally located memory.

A plurality of peripheral devices can be disposed remote to the shared memory system. One or more of these devices can be configured to access the centrally located memory and generate addresses to address memory locations in the centrally located memory system. In this manner, the peripheral device can transfer data thereto or retrieve data therefrom. A memory interface device can be provided between each of the peripheral devices and the centrally located memory system to control the transmittal of addresses from the associated peripheral device to the centrally located memory and the transfer of data therebetween. In one embodiment, the memory interface device has a unique ID, which is transmitted to the centrally located memory.

According to another aspect of the invention, a portion of the centrally located memory is reserved or used for controlling peripheral devices or other entities having access to the memory. For example, in one embodiment, common address space is reserved, to which values can be written, wherein the values written can be used to control functions for the various entities. For example, these values can control parameters such as device priority, processor reset, interrupts, polling ID, fair bit and so on. In this embodiment, a processor or entity can write a value to a memory location associated with another processor or entity. More specifically, one processor can use this write operation to write a value to a particular memory location to change one or more parameters of one or more other processors.

In one embodiment, an arbitration device is associated with the centrally located memory. The arbitration device can be used to determine which of the peripheral devices is granted access to the centrally located memory. In one embodiment, the centrally located arbitration device is used to allow a host process to arbitrate for access to the centrally located memory, and a distributed arbitration scheme is used to allow peripheral processors.

In one embodiment, the arbitration device operates on a block-by-block basis to allow each peripheral unit to access the centrally located memory for a block of data before relinquishing access. In one aspect of this embodiment, wherein all requesting ones of the peripheral devices will have access to at least one block of data prior to any of the peripheral devices having access to the next block of data requested thereby.

In an alternative embodiment of the invention, each block of data comprises a unit of data. This unit can be, for example, a bit, a byte, a word, or other unit of data. Further, each memory interface device is given a priority value based upon its priority and/or its unique ID. The arbitration device operates in a second mode to allow the highest priority one of the requesting peripheral devices to seize the bus away from any of the other peripheral devices to access all of the data requested thereby. In one embodiment, the device ID is used to break ties that may arise on priority contests based solely on device priority.

According to another aspect of the invention, an arbitration system and method provides self-arbitration among a plurality of processors or other entities vying for access to the bus or other shared resource. In this embodiment, the entities vying for access to the shared resource present their respective priority values to an evaluation medium. The evaluation medium determines the highest priority value of those values presented, and provides this "winning" value to the competing entities. The entities compare the received "winning" value to their respective presented values. If an entity makes a positive comparison, that entity won the arbitration and is granted access to the shared resource. This arbitration technique can be used for any implementation in which two or more entities are vying for access to one or more shared resources, and is particularly useful in the context of the present description in which two or more processors are competing for access to a system bus, with or without bus memory.

Further features and advantages of the invention as well as the structure and operation of various embodiments of the invention are described in detail below with reference to the accompanying drawings.

BRIEF DESCRIPTION OF THE DRAWINGS

For a more complete understanding of present invention and the advantages thereof, reference is now made to the following description taken in conjunction with the accompanying Drawings in which:

FIGS. 6 and 7 illustrate a timing diagram for the memory access;

DETAILED DESCRIPTION OF THE INVENTION

Figure 1:
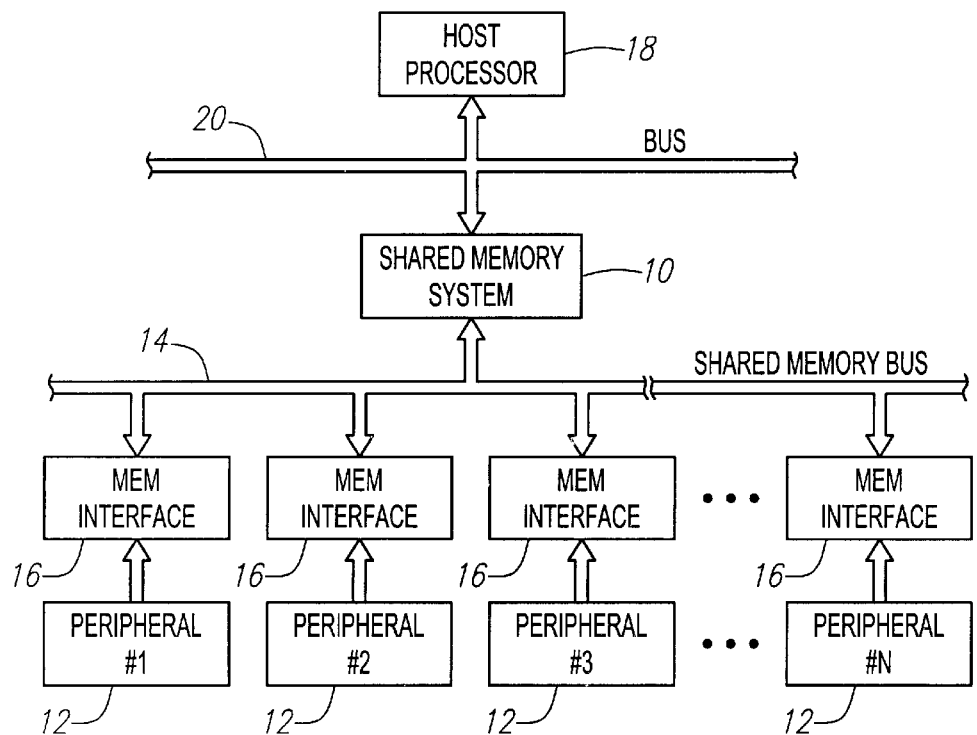
FIG. 1 illustrates an overall block diagram of the system.

FIG. 1, is a block diagram illustrating a multi-processor system. At the heart of the system is a shared memory system 10 which in one embodiment, as described below, provides a centrally located memory that is accessible by a plurality of peripheral systems 12. Shared memory system 10 is operable to serve each of the peripheral systems by receiving requests for data transfer. Such requests can include, for example, reading or writing data to the centrally located memory in the shared memory system 10, and arbitrating the service among peripheral units 12. Also, as described below, various priorities can be assigned to the peripheral units 12. Shared memory system 10 is operable to interface with each of the peripheral memories 12 through a shared memory bus 14. Each of the shared memory buses 14 are connected to the various peripheral memories 12 through an interface 16. In addition, in the preferred embodiment a host processor 18 is provided. In one embodiment, host processor 18 is given the highest priority in the system, and is operable to interface with the shared memory system 10 via a bus 20. The host processor 18 functions similar to the peripheral units 12 and, in fact, is logically a peripheral system to shared memory system 10. Host processor 18 can include additional functions with respect to initializing the operation, etc.

Figure 2:
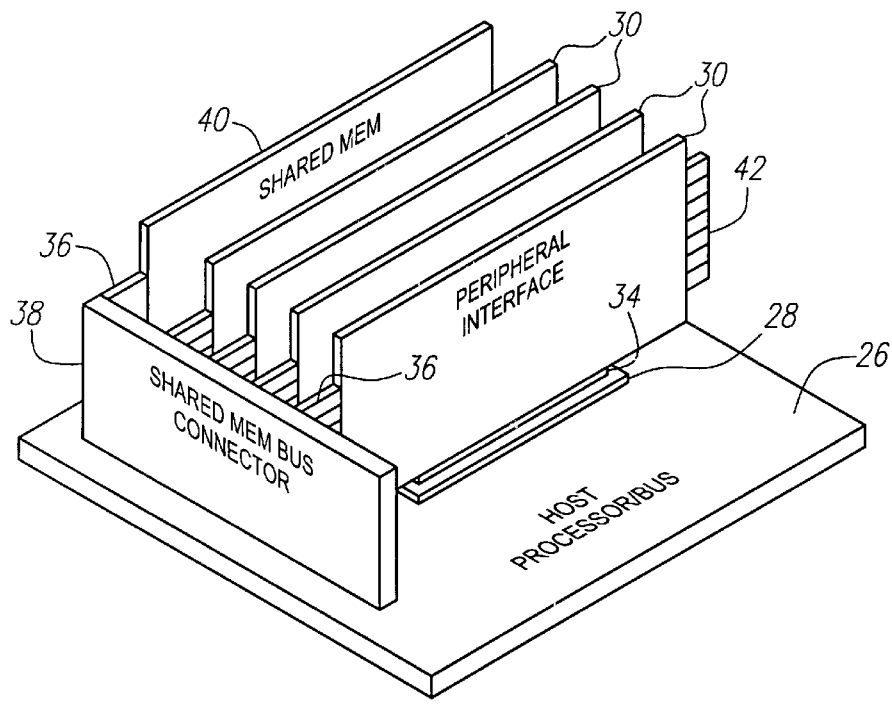
FIG. 2 illustrates a perspective view of the physical configuration of the system.

FIG. 2 illustrates a perspective view of an example physical configuration for a system such as that described with reference to FIG. 1. The example configuration illustrated in FIG. 2 includes a processor board, a bus, and one or more peripheral interfaces. Specifically, in the embodiment illustrated in FIG. 2, the system utilizes an host processor board that includes host processor 18 and the bus 20. In the illustrated embodiment, a plurality of bus connectors 28 are included, into which a plurality of peripheral interface boards 30 are inserted. One or more of the peripheral interface boards 30 can include an interface connector 34 to provide an interface to the bus. Additionally, each of the peripheral interface boards 30 can include a peripheral interface connector 42 to interface with peripheral device 12.

In addition to peripheral interface boards 30, a shared memory board 40 can be included. In one embodiment, shared memory board 40 is disposed in one of the memory bus connectors 38 on the host processor/bus board 26. Shared memory 40 can include a shared memory bus connector 36 such that it can be interfaced with the common shared memory bus connector 38. Although shared memory 40 is illustrated as being physically centrally located, shared memory 40 can alternatively be distributed among the plurality of peripheral devices 12.

Peripheral devices 12 can be of many different types. One example is a peripheral device 12 that utilizes an RS232 communication protocol to access the shared memory system 10. When peripheral device 12 generates an address to access the shared memory, peripheral interface board 30 services this request and generates the instructions to shared memory board 40 to access the memory disposed thereon. This can also include any memory mapping function that may be required. It is noted that in a preferred embodiment, peripheral interfaces 30 can include a priority value for the shared memory bus. The priority value can reflect both priority and the ID of the board and, hence, determine how a shared memory system 10 services memory access requests from peripheral interface boards 30. As described below, each of the peripheral interface boards 30 can buffer memory requests from peripheral device 12 until they are served by shared memory system 10.

As would be apparent to one of ordinary skill in the art after reading the above description, alternative architectures or implementations could be utilized. For example, peripheral devices or other entities could interface to the bus directly, without the need for peripheral interface boards 30, or with an alternative interface. Additionally, alternative physical configurations could be implemented to interface the processors or other entities to the host processor via the shared memory.

Figure 3:
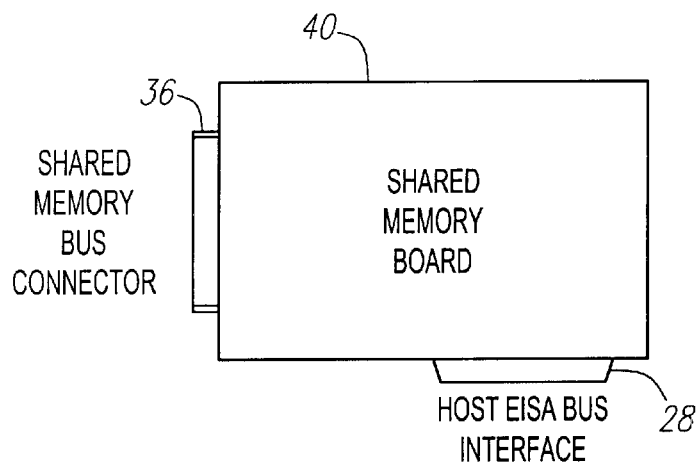
FIG. 3 illustrates an example implementation of a shared memory board.
Figure 4:
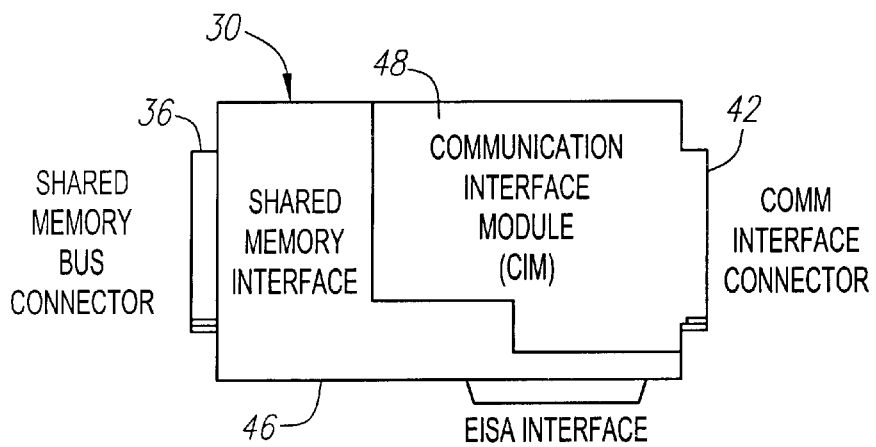
FIG. 4 illustrates an example implementation of a peripheral interface board.

FIGS. 3 and 4 illustrate example layouts for boards 30, 40. Specifically, FIG. 3 illustrates an example implementation for shared memory board 40. In this example implementation, shared memory board 40 includes shared memory bus connector 36 and host bus interface connector 28. Of course alternative implementations are possible. For example, alternative connectors or interface devices could be used to interconnect the memory to with the bus.

FIG. 4 illustrates an example implementation of peripheral interface board 30. In this example embodiment, peripheral interface board 30 is comprised of two sections, a shared memory interface section 46 and a Communication Interface Module (CIM) 48. Shared memory interface section 46 provides an interface between the bus 14 and communication interface module 48.

Communication interface module 48 can be used to determine the nature of peripheral interface board 30 and to provide communications to each peripheral accordingly. Communication interface module 48 can be used to perform a protocol or format conversion between peripherals 12 and the bus. For example, assume that a peripheral interface board 30 is associated with an RS232 peripheral device 12. In this example, communication interface module 48 can be implemented to convert between a parallel data system and a serial RS232 data system for that peripheral device 12. In this example, transmission signals to and from the peripheral device 12 are made using the RS232 interface protocol, while communications with the shared memory are made using parallel data transfer.

In one embodiment, shared memory interface portion 46 includes various processors to allow it to interface with shared memory system 10 via shared memory bus 14. If communication interface module 48 is associated with an ISDN function, for example, communication interface module 48 can also provide the interface between a parallel bus and an ISDN format. The functionality of a communication interface module 48 can be similar to that of peripheral boards in an EISA, PCI or other bus architecture. That is, it can allow for conversion between a parallel bus and the communication identity. As such, entities of varying types and having diverse communications interface protocols or standards can be easily interfaced to the system bus.

Figure 5:
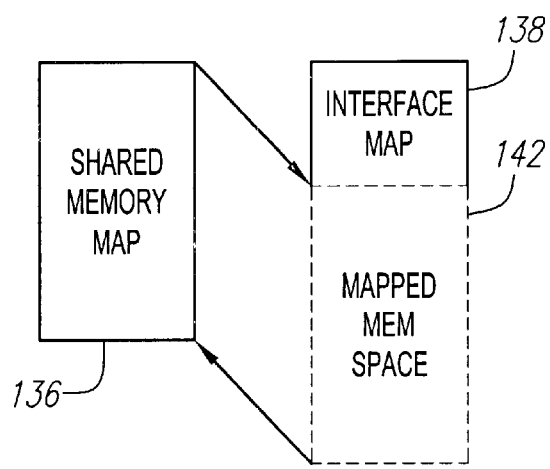
FIG. 5 illustrates a memory map of the system of the present invention.

FIG. 5 illustrates a diagrammatic view of the address space of the shared memory system according to one embodiment. A shared memory map 136 is provided, representing the memory map of the shared memory system 10. Shared memory map 136 could be any size, depending on system requirements. In general, in the memory space associated with the shared memory system 10, the first location in the memory map 136 is represented by the '0' location. By comparison, the entity, peripheral or peripheral interface board 30 has associated therewith a map 138. This allows a designated portion of memory to be associated with peripheral interface board 30. This local memory provides the ability for peripheral interface board 30 to perform multiple processing functions at peripheral interface board level. These operations are described in some detail below.

In one embodiment, when data is being transferred to peripheral interface board 30 there is no conflict between the two memory spaces. Therefore, data being transmitted to shared memory system 10 has a different address above the physical memory space. This is facilitated by defining the address space for shared memory system 10 relative to the input to the peripheral interface board from the peripheral unit 12 as being at a higher address. Therefore, the '0' location in the address space of map 136 appears to be in a different portion of the memory space of peripheral interface board 30 above the memory space. This is represented by a virtual memory space 142. When an address exists in this space, it is recognized and transmitted to the shared memory system 10 after translation to the address space of shared memory system 10. This allows an address to be generated at the peripheral unit 12 and then transmitted to the shared memory system 10.

FIGS. 6 and 7, are timing diagrams illustrating an arbitration sequence for two modes of operation, a unit-by-unit arbitration mode and a priority-based bus seizing mode. The two modes are facilitated by a control bit referred to as a "Fair" Bit that, when set to '1' causes the mode to operated in a unit-by-unit mode and when set to '0', forces the system to operate in the priority-based bus-seizing mode. FIG. 6 illustrates the unit-by-unit mode and FIG. 7 illustrates the priority-based bus-seizing mode.

With further reference to FIG. 6, by way of example, there are illustrated five bus accessing entities: the host system and four peripheral units 12. As described above, host processor 18 operates as an ordinary accessing entity with the exception that, in one embodiment, it is given the highest priority. In many systems, memory access requires four cycles. The first operation is a bus request sent from the peripheral interface board to shared memory system 10. When this is processed, a bus grant signal is sent back from shared memory system 10 to peripheral interface board 30. On the next cycle, an address is transmitted to peripheral unit 12, followed by data in the next cycle. This is then repeated for the next unit of information transmitted. As such, four cycles in the timing diagram of FIG. 6 are required for each unit of data transmitted. However, in one embodiment, the arbitration logic 78 provides a pseudo-concurrence of data transfer. This pseudo-concurrence is provided in that each peripheral board is allowed to seize the bus for the purpose of transferring one unit of data. Therefore, the bus is relinquished to another peripheral interface board 30 to allow it to transfer a unit of information, and so on. As such, this provides a relatively fair use for a fully loaded system such that a single peripheral interface board 30 cannot seize and occupy the bus. In applications such as, for example, a massive transfer of video or image information, it is desirable to allow all peripheral systems to have as much access to the data as possible. This is true especially for systems such as interactive applications. For example, when two systems are accessing the same database such that two peripheral systems interact with each other, it is possible that one system be able to write to a memory location in one cycle (i.e., four uninterruptable memory access cycles used for the memory system), and then another peripheral system is able to access the data on the next data transfer cycle. This provides flexibility in an interactive system utilizing a shared memory. If, on the other hand, one system were allowed to seize the bus, it would virtually isolate another peripheral system from the memory while it has seized control of it. This would detract from the interactive nature of any type of shared memory application.

In the system illustrated in FIG. 6, the peripheral unit P3 initially generates a bus request, followed by receipt of the bus grant and then transmission of address and data. Upon the next cycle, three bus requests are then received, one from peripheral unit P2, one from peripheral unit P4 and one from peripheral unit P5. However, due to the priority nature of this system, the bus is released to peripheral unit P2 for transfer of data therebetween. However, the bus requests for P4 and P5 remain. Upon the next data transfer cycle, the bus is relinquished to P4. At the end of this cycle, a decision is made as to the next peripheral unit to receive it. At the end of the data transfer cycle for P4, the host generates a bus request. Although the system is operable to grant the request to the first requesting peripheral unit, the host can have maximum priority and bus access is granted to the host. However, at the end of the transfer cycle of the bus to the host, the host is forced to release the bus and it is given to peripheral unit P5. However, the host still desires to transfer information and the bus request is maintained at the end of the data transfer information by P5, the bus is released back to the host. It is important to note that if all peripheral units including the host constantly generate bus requests, the system would divide the operation up such that all 5 peripheral units had the same amount of access to the bus in an alternating timeslot method. This provides the maximum throughput efficiency for all systems.

With further reference to FIG. 7, there is illustrated the system wherein a priority bus seizure mode is facilitated. In this mode, arbitration logic determines when a bus request is received from one of the peripheral units or the host, and then allows the one having highest priority to seize the shared memory bus. In one embodiment, the arbitration among the peripheral units or other entities is distributed among those entities as a self arbitration, self granting scheme. Arbitration logic may also be provided in this embodiment to allow the host process to arbitrate for access to the shared memory as well.

The priority bus seizure mode is now described. If a bus request is received from a higher priority system, the lower priority system is forced to relinquish the bus and give it to the highest priority system. In FIG. 7, the bus request is initially received from a peripheral unit P2. In the initial bus request, two cycles are required to process the bus request and then return a bus grant. Thereafter, the system enters a different mode that does not require further bus requests and bus grants to be processed for P2. As long as a higher priority system does not request the bus, the transfer operation requires only two cycles, comprised of generating an address followed by transfer of data. This continues until a bus request is received from the host, which then transmits a bus grant after the last data transfer operation following the bus request by the host. Once the bus grant has been transmitted, the system falls into a mode where two cycles are required, comprised of two sequential transmissions of address and data. It is noted that a bus request is also transmitted by P3 and P4 but are never serviced because the bus request for P2 and the host was maintained, with the host overriding P2. Although for a given peripheral unit, this results in a much faster data transfer operation (a 2× increase), this does not provide for fair use over all peripheral units, wherein the lowest priority one can be completely locked out of access to the shared memory system 10.

In the priority operation, the reason for allowing a peripheral unit to have full access to the bus is such that the peripheral device itself can service the type of media that is associated with the peripheral device 12. For example, if the peripheral device 12 were associated with a video application, it may be desirable for the data transfer to occur uninterrupted. Therefore, the shared memory interface 46 can generate the Fair bit. Because the tasks being performed by the peripheral devices 12 may change over time, it may be beneficial to allow the peripheral devices 12 to set and reset their own fair bits in real time, as their tasks change. Thus, in one embodiment, the peripheral devices 12 set and reset their own fair bits on the fly, as their demands change.

By allowing the shared memory interface 46 associated with the peripheral device 12 to set and reset the fair bit, it can determine whether its application needs to "seize" the bus. Therefore, all peripheral units could generate the fair bit as a '0' and desire to "seize" the bus. In this situation, of course, the priority would determine which peripheral unit is allowed to "seize" the bus. Normally, however, the Fair bit will be set to '1', allowing a unit-by-unit transfer. In one embodiment, values written to designated locations in shared memory can be used to change a processor's fair bit. In this manner, other processors or entities can use this shared memory to change another processor's fair bit setting.

Figure 8:
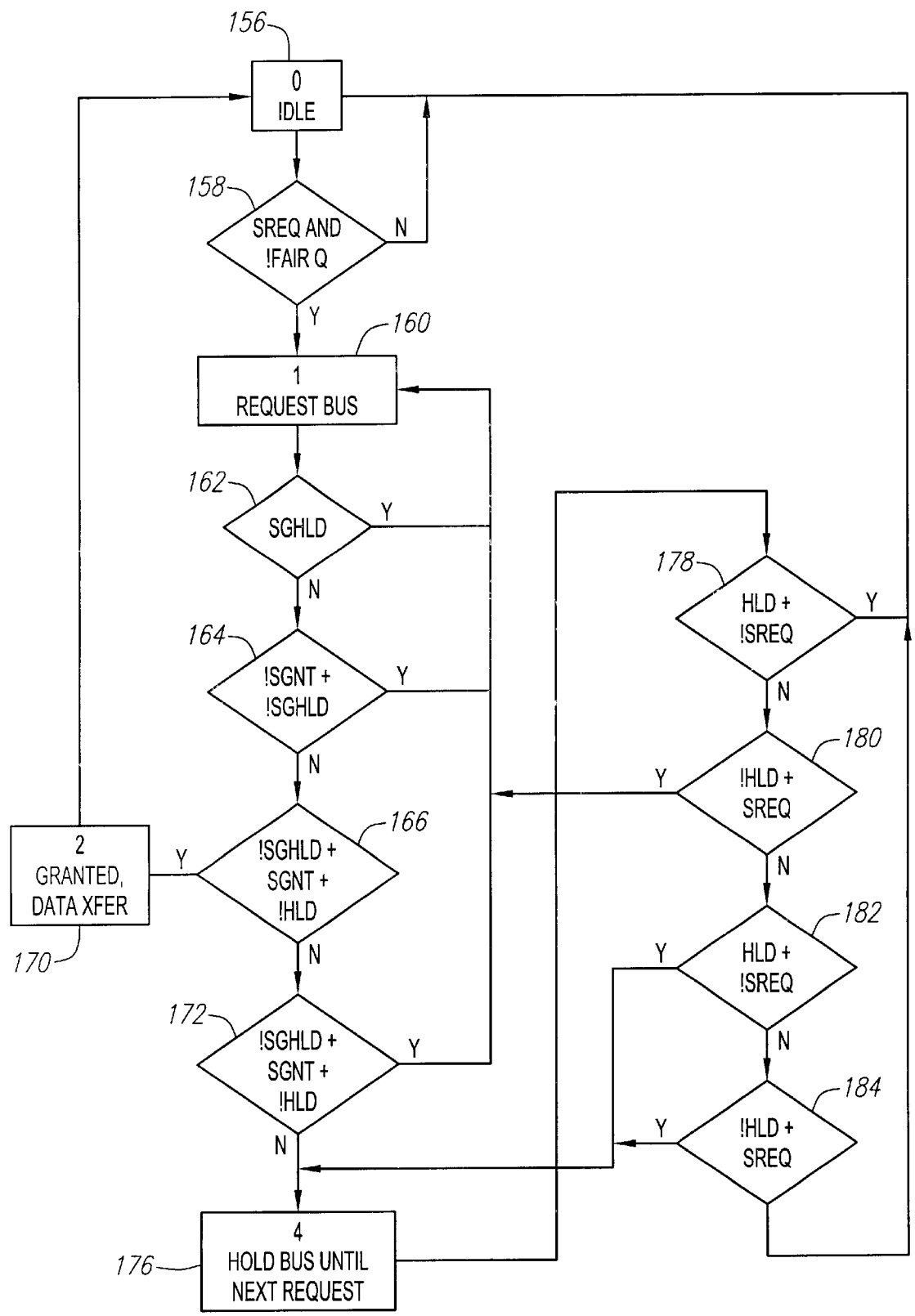
FIG. 8 illustrates a flowchart for the operation of the system.

FIG. 8 is an operational flow diagram illustrating a state diagram for the transfer operation according to one embodiment of the invention. The state diagram is initiated at a block 156, which is the '0' state indicating the idle state. The state diagram then flows to a decision block 158 to determine if a slave request signal for a bus (SREQ) under the condition wherein the FAIR bit is set equal to '1' (!FAIRQ). For the purposes of this flowchart, the following table lists the various commands:

TABLE I

| SREQ | Slave Request |
|---|---|
| !FAIRQ | FAIR Bit Set = 1 |
| SGHLD | Slave Grant Hold |
| SGNT | Slave Grant |
| HLD | Hold Command Generated by Shared Memory |

In the mode depicted in the decision block 158, SREQ is only serviced when the fair bit is set equal to one. Until this occurs, the program flows along the "N" path back to state block 156. When the slave request is received and the fair bit is set equal to zero, the state diagram transitions to a function block 160, which represents the state one of the state diagram. This is the state wherein the bus is being requested. The state diagram transitions to a decision block 162 to determine if SGHLD signal is generated, indicating a hold operation. If this occurs, the state diagram transitions back in a loop to the decision block 160 until the SGHLD signal is removed. The state diagram then transitions along the "N" path to a decision block 164 to determine if the !SGNT and !SGHLD are present. This indicates that both the bus grant for the slave has been generated and the bus grant hold signal have been removed. Until this occurs, the program transitions along the "Y" path back to the state block 160. When the SGHLD signal is removed and the SGNT signal is generated, the program transitions along the "N" path to a decision block 166. This indicates that there is no hold of the grant and that the grant has been sent from the shared memory system 10 to the peripheral interface board 30. The decision block 166 determines if the SGHLD signal is removed (!SGHLD), whether the SGNT signal has been generated and whether the HLD signal has not been generated (!HLD). If the SGHLD signal is not generated, indicating there is no hold on the grant, the SGNT signal is sent, indicating a bus grant condition, and the HLD signal is not present, indicating there is no hold on the system, the state diagram would transition along the "Y" path to a state block 170 indicating the state to wherein bus access is granted and data transfer can occur. The state diagram would then transition back to the idle state in block 156 and continue along this loop as long as the conditions of decision block 166 are generated.

When either the bus grant has been removed, a bus grant hold has been generated or a hold ahs been generated, the program transitions along and "N" path from the decision block 166 to a decision block 172. The decision block 172 determines if the conditions of decision block 166 remain the same or if the signals have changed. If the state diagram transitions from the decision block 166 to the decision block 172 and conditions change, the state diagram transitions along the "Y" path from decision block 172 back to the state one block 160. However, if they remain the same, the state diagram transitions to the next state, state four, as indicated by a block 176, indicating the condition wherein the bus is held until the next request has been received. The state diagram then transition to a decision block 178 to determine if the HLD signal is present and the bus request is not present. If so, the program transitions along a "Y" path to the idle state block 156. If either the HLD signal has been removed or the bus request has been received, the state diagram transitions along the end path to a decision block 180 to determine if the HLD signal has been removed and the bus request has been generated. If so, the state diagram transitions back to the state block 160 to request the bus. This is the condition wherein the system was held for some other reason, there being numerous reasons for holding the bus and thus release the bus to service the bus request from the requesting one of the peripheral units 12. If either the HLD signal has not been removed or the bus request is not present, the state diagram transitions along the "N" path to a decision block 182 to determine if the HLD signal is still generated and the bus request is not present. If not, this generates a Hold state and a state diagram transitions along a "Y" path to the state block 176 to continue the bus hold operation. If the HLD operation is still present or the bus request has been generated, the state diagram transitions along the "N" path to a decision block 184 to determine if both the hold operation is present and the bus request is present. If so, the program transitions along the "Y" path to the state block 176. However, if either the HLD signal is not generated or the bus request is not generated, the state diagram will flow back to the idle block 156.

It should be noted that at decision block 158, a priority decision is made. The bus request will be serviced base upon the priority. Once data transfer has occurred, the priority of that peripheral unit falls to the lowest priority, and the arbitration logic 78 services the next received bus request in the first-in, first-out mode, placing the previous requesting peripheral unit at the bottom of the queue.

Figure 9:
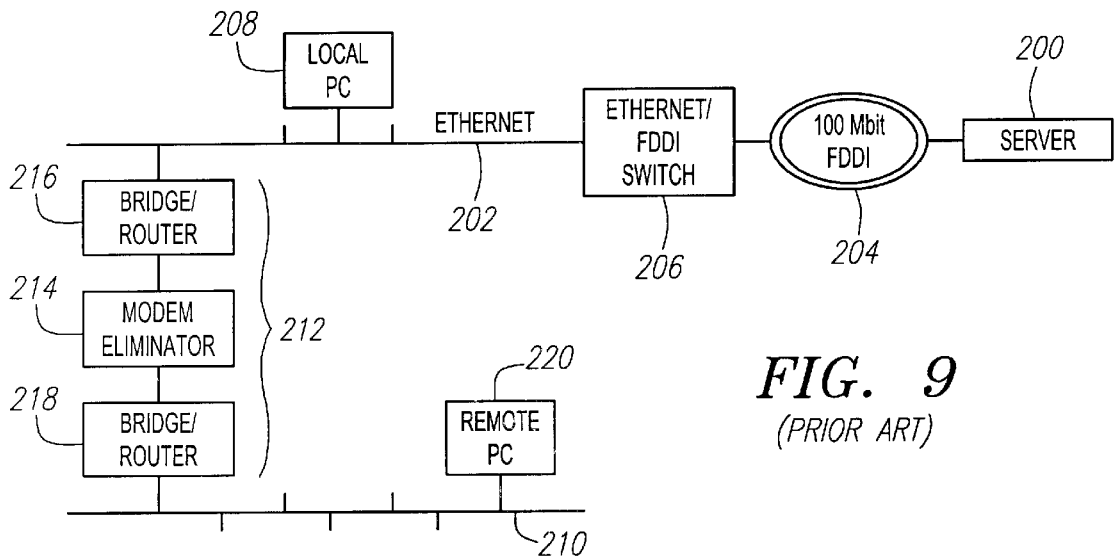
FIG. 9 illustrates a prior configuration for the overall system.

FIG. 9, is a block diagram illustrating a prior system. In the prior system, there is illustrated a server 200, which is operable to contain the main server memory. The server 200 is interface with an Ethernet® cable 202 via an FDDI system 204 which is a high speed communication link operating at approximately 100 Megabits/second. This will therefore require an Ethernet®/FDDI switch 206 to interface between the Ethernet® cable 202 and the FDDI network 204. A local PC 208 is a single peripheral unit that interfaces with the Ethernet® cable 202. However, multiple peripheral units in the form of local PCs, tape drives, etc. can be interfaced with the Ethernet® cable 202. Additionally, a remote Ethernet® 210 provided which is interfaced with the Ethernet® 202 via a communication link 212. The communication link 212 is comprised of a modem eliminator 214 that is connected to the Ethernet® 202 via a bridge/router block 216 and to Ethernet® 210 via a bridge/router block 218. This is a 56 kilobaud system that operates at a significantly lower baud rate than the Ethernet® cables 202 and 210. Therefore, a remote PC 220 is disposed on the remaining Ethernet® 210 and desires to access the server, it must go through Ethernet® 210, through the communication link 212 at the 56 kilobaud rate to Ethernet® 202. This is then routed to server 200 via the FDDI network 204. Therefore, all the systems must share a common bus network with some master on the bus (i.e., a bus master) controlling bus contention.

However, in a system with the normal operation, once a peripheral unit has seized the bus, it is allowed to maintain contact with server 200 to transfer the requested data. It should be understood that peripheral units do not control transfer of data to and from the main memory at server 200; rather, they merely request access to data locations for the purpose of storing information therein or retrieving information therefrom. The entire memory access system function is transparent to the actual peripheral unit.

Figure 10:
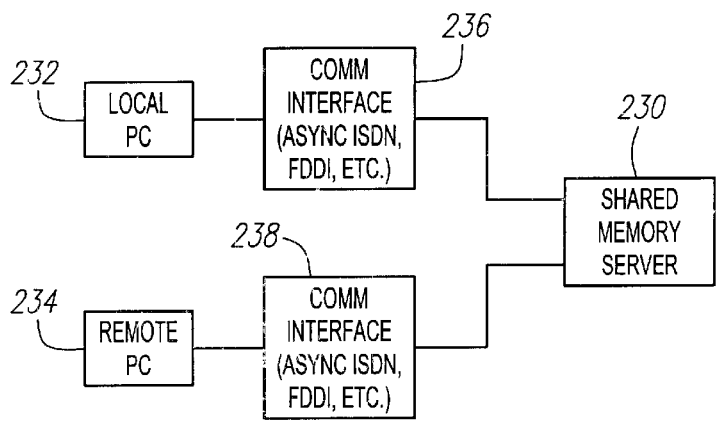
FIG. 10 illustrates the configuration for the system of the present invention.

FIG. 10, is a diagram illustrating differences between a conventional system and that of the present system. A shared memory server 230 is comprised of the shared memory system and the peripheral interface boards 30. There is provided a local PC 232 and a remote PC 234, indicating two separate peripheral units. These two peripheral units are interfaced through a communication interface 236 and 238, respectively. However, it is noted that they are directly interfaced to the shared memory server 230 as opposed to going through some type of indirect bus interface. This allows them to directly connect to the shared memory server with the arbitration logic 78 in the shared memory server 230 providing the bus contention control and allowing pseudo-concurrence in the data transfer.

Figure 11:
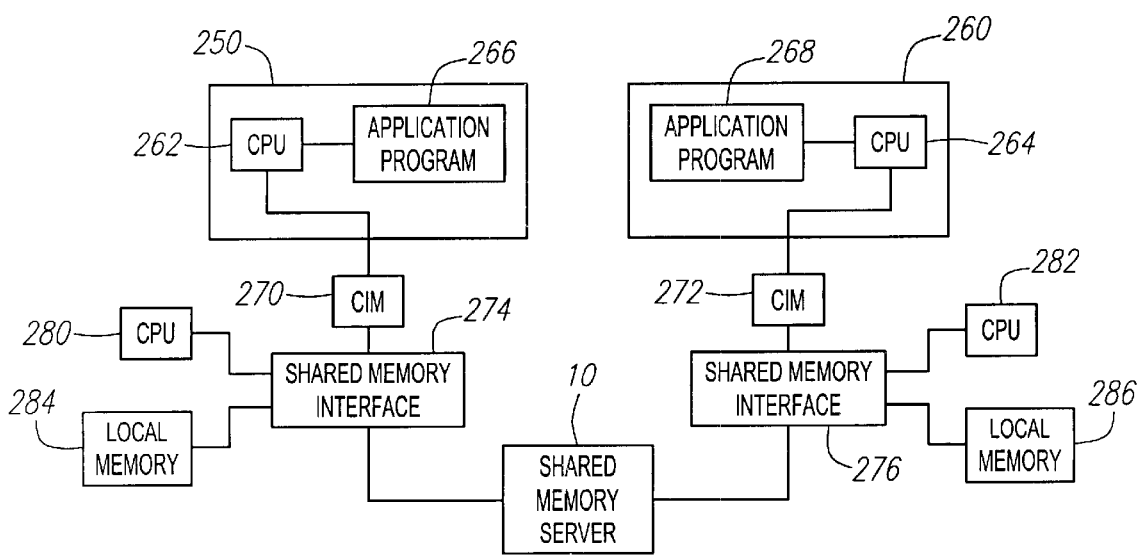
FIG. 11 illustrates an alternate block diagram of the present invention.

FIG. 11, is a diagram illustrating an alternative implementation of a shared memory system. In this embodiment, shared memory system 10 is connected to two peripheral units 250 and 260. Each of the peripheral units 250 and 260 can operate in different modes such that the data transferred to the shared memory system 10 and retrieved from the shared memory system 10 can be in a different format. Each of the peripheral units 250 and 260 can have a local CPU 262 and 264, respectively, and an application program 266 and 268, respectively.

For example, consider a situation where CPU 262 is operating a word processing program from one manufacturer in a first format and CPU 264 in the peripheral unit 260 is operating a word processing program in a second format. Typically, the two formats are not compatible, such that if a file in the first format is imported into the application program portion of the second format, it will not directly read this file correctly. Rather, it must recognize that it is in a different format and run an import program to import the data in that format. This can present a problem in dealing with a shared memory between two separate application programs. If the systems are correctly programmed, the CPUs 262 and 264 could export the data to the shared memory system 10 in a common format.

However, in one embodiment, shared memory system 10 utilizes a proprietary format, such that the data is retrieved and stored in a common format that is not necessarily known to the CPUs 262 and 264 and the peripheral units 250 and 260, respectively. Each of the peripheral units 250 and 260 is interfaced with CIMs 270 and 272, respectively, the CIMs 270 and 272 interface with shared memory interfaces 274 and 276, respectively. CIMs 270 and 272, as described above, are a function of the type communication link of interface that is required. For example, the CIM 270 could be an Ethernet® adapter with the peripheral unit 250 disposed on an Ethernet® system and the CIM 272 could be an RS232 interface with the peripheral unit 260 connected through the shared memory system 10 via a serial port. The CIM 270 is operable to convert the Ethernet® data to a format compatible with the shared memory interface 274 in the form of a parallel address and parallel data word in a shared memory compatible architecture. Therefore, the CIMs 270 and 272 are merely an interface between the shared memory interfaces 274 and 276, respectively and the respective one of the peripheral units 250 and 260.

In the embodiment illustrated in FIG. 11, the shared memory interfaces 274 each have a local CPU 280 and 282, respectively. They also have local memory 284 and 286, respectively. The CPUs 280 and 282 are provided to allow the shared memory interfaces 274 to provide some distributed processing. For example, the actual conversion of formats as discussed above can be performed by shared memory interfaces 274 and 276. This would therefore allow the shared memory interfaces 274, 276 to make the determination as to the format received and then convert it to the common format without the need for CIMs 270, 272. Programming the memory interface to perform format conversions frees the application programs from performing this task. As such, the entities access the shared resource do not have to concern themselves with particular formats of shared memory system 10. In addition, other processes could be performed at the CPU. However, shared memory interfaces 274 and 276 could be configured such that they do nothing more than transfer the addresses and data to shared memory system 10 and generate the various bus requests interfaced with the arbitration logic 78 that is internal to shared memory system 10.

When the peripheral unit 250 desires to interface with shared memory system 10, it merely transmits an address through CIM 270, which is intercepted by the shared memory interface 274 and then processed. This processing can be in the form of merely translating it to the address space of a shared memory system 10 or further processing the information. Therefore, peripheral unit 250 only needs to determine in its own address space where the stored data exists, this being a predetermined location. However, this does not correspond directly to the location in the shared memory system 10, but rather to the translated position, as described above. This therefore provides a transparent operation wherein each of the peripheral units 250 and 260 operate independently of each other and merely treat shared memory system 10 as an extension of their own memory space. Shared memory system 10 then processes the memory accesses on a unit-by-unit basis interleaving the requests such that a unit of information is first transferred between peripheral unit 250 and shared memory system 10 and then a unit of information transferred between peripheral unit 260 and shared memory system 10. This continues in this interleaved manner under control of the arbitration logic 78.

Figure 12A:
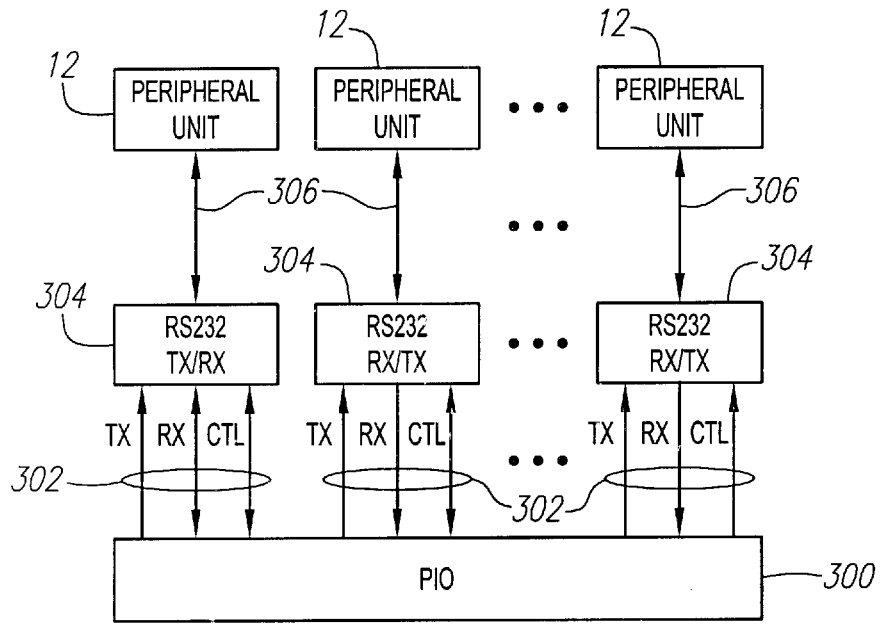
FIGS. 12a and 12b illustrate block diagrams of the CIM illustrated in FIG. 5.
Figure 12B:
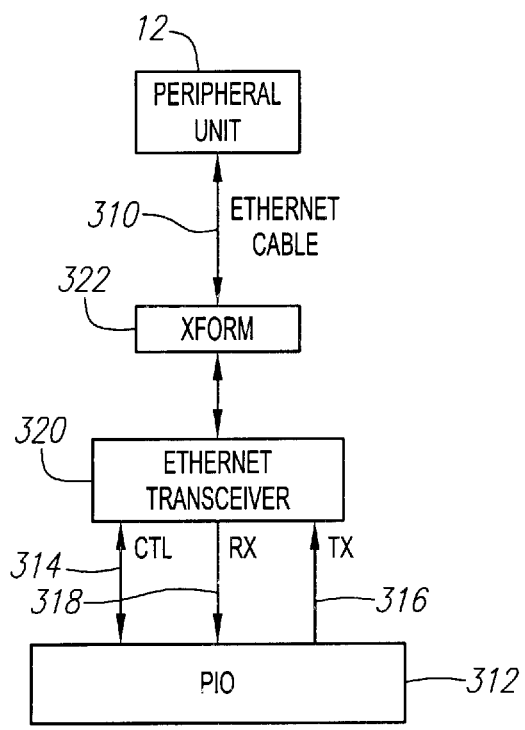

FIGS. 12a and 12b, are diagrams illustrating example implementations of a CIM 48, as illustrated in FIG. 5. In general, CIM 48 can be used to provide the "identity" to the system (i.e., to what type of system peripheral 12 is attached and through which it communicates). Shared memory interface 46 provides the processing capability to interface between shared memory system 10 and CIM 48. As noted above, CIM 48 can allow shared memory interface 46 to interface with any type of communication protocol, such as, for example, RS232, Ethernet®, etc. FIG. 12a, illustrates a CIM 48 for interfacing with a plurality of peripheral units 12 via an RS232 interface. FIG. 12b illustrates the interface over a single Ethernet® cable.

With specific reference to FIG. 12a, I/O 100 of FIG. 5 is illustrated as a parallel I/O chip (PIO) 300. In the RS232 mode, PIO 300 associated with shared memory interface 46 can support multiple RS232 ports. For each RS323 port, a transmit line, receive line and control line are provided. There can be multiple groups of transmit/receive/control lines 302 output from PIO 300. Each of the output ports 302 are connected to an RS232 transceiver 304 on the CIM 48. In one embodiment, the RS232 transceiver chips are of the type MC 145406, manufactured by Motorola, although alternative transceivers can be used. Each of the RS232 transceivers 304 is operable to interface with an RS232 cable 306. Cables 306 then interface with remote peripheral units 12. In operation, PIO 300 can not only select one of the RS232 transceivers 304 for transmittal of data between the peripheral unit 12 and the PIO 300 via an RS232 protocol, but PIO 300 can also generate the appropriate commands under the control of the CPU 96 on the memory interface 46, as described with respect to FIG. 5.

FIG. 12b, illustrates a block diagram of an example implementation of CIM 48 utilized with an Ethernet® cable 310. An Ethernet® PIO 312 is provided which again assists in giving an identity to the overall memory interface 16, described above with respect to FIG. 1. This PIO 312 can be the same PIO as that illustrated in FIG. 12a with reference to the PIO 300. The only difference in this example is that a different program is implemented in the shared memory interface 46, this program giving the "identity" to the overall shared memory interface 46. As noted above with respect to FIG. 3b, the CIM 48 is a separate board that is plugged into the actual board that supports the circuitry for the shared memory interface 46. As noted above with respect to FIG. 3b, the CIM 48 can be implemented as a separate board that is plugged into the actual board that supports the circuitry for the shared memory interface 46. This allows the same shared memory interface board 46 to be utilized for different "identities" of the communication interface module 48. In the example of FIG. 12b, this identity is that of an Ethernet®. The Ethernet® protocol uses a set of control lines 324, transmit lines 316 and receive lines 318. These are input to an Ethernet® transceiver chip 320, which is a highly integrated chip available from companies such as Motorola. The output of the Ethernet® transceiver chip 320 is connected through a transformer 322 to the Ethernet® cable 310. The Ethernet® transceiver 320 is a conventional chip and the operation thereof is well known.

In summary, a shared memory system includes a centrally located shared memory that has an associated shared memory bus. The shared memory is connected through shared memory interfaces to different peripheral units or entities via various communication links. The shared memory interfaces interface with arbitration logic in the shared memory system. The arbitration logic can determine the time that each peripheral unit is allocated for transfer of data to and from the shared memory system. The arbitration logic controls the system to allow a single unit of data to be transferred to each entity on a unit-by-unit basis such that each peripheral unit is only allowed access to the bus for a single unit of information. The bus is then relinquished to the next requesting one of the peripheral units. This continues until all data has been transferred.

The above description provides one or more scenarios in which one or more entities such as, for example, processors a peripheral devices, compete to utilize a shared resource such as, for example, a host processor, a shared bus or a shared memory bus. Typically, in these and other similar situations where two or more entities are in contention for a shared resource, some form of arbitration technique is implemented to resolve conflicts among the entities. Thus, the arbitration technique determines which entity is granted access to the shared resource. Typical arbitration techniques involve a third-party resource that acts as the arbiter to determine which of the competing entities should be granted access to the shared resources. This third-party arbiter receives access requests from the competing entities and, based on their relative priorities, determines which entity should gain access to the resource and grants such access to that entity.

Figure 13:
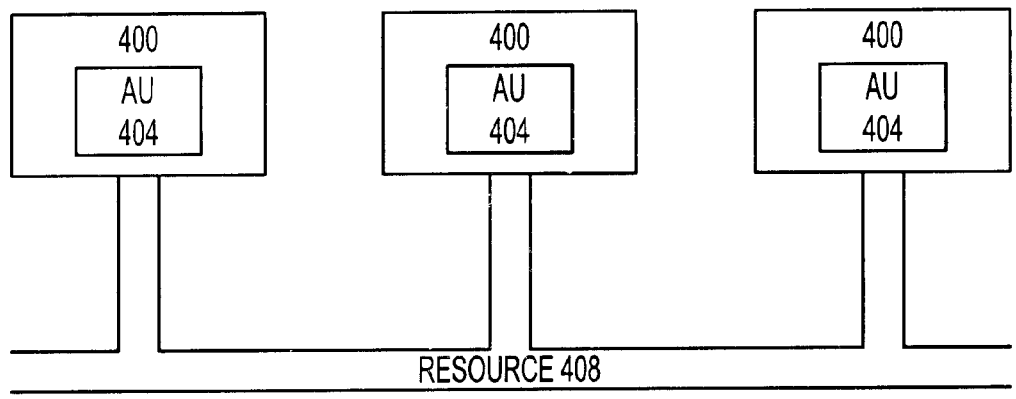
FIG. 13 is a block diagram illustrating an example application of an arbitration scheme according to one embodiment of the invention.

According to one aspect of the invention, an arbitration technique is provided whereby the competing entities themselves determine whether they should be granted access to the shared resource. This self-arbiting, self-granting arbitration technique allows the competing entities themselves to make the arbitration determination. This self-arbiting, self-granting arbitration techniques is now described in accordance with one or more embodiments. To facilitate the description of this self-granting, self-arbiting technique, it is described in terms of an example application. FIG. 13 is a block diagram illustrating this example application. Referring now to FIG. 13, in the illustrated application two or more processors 400 are competing with one another for access to the shared bus 408. Thus, the arbitration technique, is described in terms of two or more processors 400 vying for access to a shared bus 408. After reading this description, it will be apparent to one of ordinary skill in the art how to implement the arbitration technique in other environments where, perhaps, alternative entities are vying for access to one or more alternative shared resources.

In accordance with one embodiment of the invention, each entity (e.g., processor 400) vying for access to the shared resource (e.g., bus 408) includes an arbitration unit 404. Arbitration unit 404 performs the self-arbiting, self-granting arbitration functions described herein. As will become apparent to one of ordinary skill in the art after reading this description, arbitration units 404 can be implemented using hardware, software, or a combination thereof. Arbitration units 404 perform the necessary arbitration function to determine which of the plurality of processors 400 shall be granted access to the bus 408 for any given arbited cycle. In one embodiment, each entity can also determine its own priority value based on one or more priority-related factors, as discussed in more detail below.

Generally speaking, in accordance with one embodiment of the invention, if a processor 400 wishes to gain access to bus 408, processor 400 enables its arbitration unit 404. Arbitration unit 404, once enabled, places its priority value on bus 408. This is true for each processor 400 wishing to gain access to bus 408. That is, in other words, for each processor requesting bus access for a given bus cycle, that processor 400 enables its arbitration unit 404 to place its priority value on bus 408. The priorities are compared on bus 408, and the highest priority is fed back to each of the requesting arbitration units 404. In one embodiment, this comparison is performed using a wired-OR comparison in which each of the asserted priorities are wire-OR'd with one another resulting in the highest priority value being fed back to each of the requesting arbitration units 404. If an arbitration unit 404 receives it own priority back as a result of this comparison, that arbitration unit 404 grants itself access to bus 408 for its processor 400. In the embodiment illustrated in FIG. 13, the comparison is a wired-OR comparison performed on bus 408—the very resource for which processors 400 are competing. In alternative embodiments, the priority value comparison or contest can be performed on an alternative evaluation medium, other than the bus or other resource for which the entities are competing.

Figure 14:
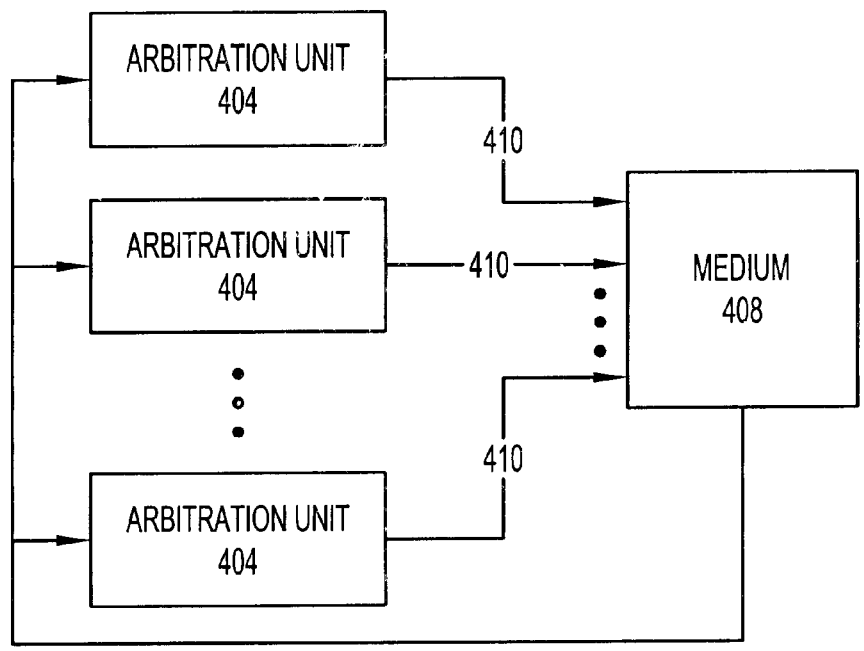
FIG. 14 is a representative block diagram demonstrating this self-arbiting, self-granting technique according to one embodiment of the invention.

FIG. 14 is a representative block diagram demonstrating this self-arbiting, self-granting technique according to one embodiment of the invention. As illustrated in FIG. 14, the arbitration unit 404 for each entity 400 wishing to access shared resource 408 provides a priority value 410 for comparison. The priority values 410 are compared to determine which is the highest value. The highest value is returned to each of the entities vying for access. The arbitration units 404 compare the returned value to the value submitted. If an entity 400 finds a match, that entity is granted access. It should be noted that FIG. 14 is not necessarily representative of a specific physical architecture for the self-arbiting, self-granting arbitration scheme, but instead is intended to illustrate the functionality thereof. After reading this description, it will become apparent to one of ordinary skill in the art how to implement this invention using numerous alternative physical architectures in hardware, software, or a combination thereof.

Figure 15:
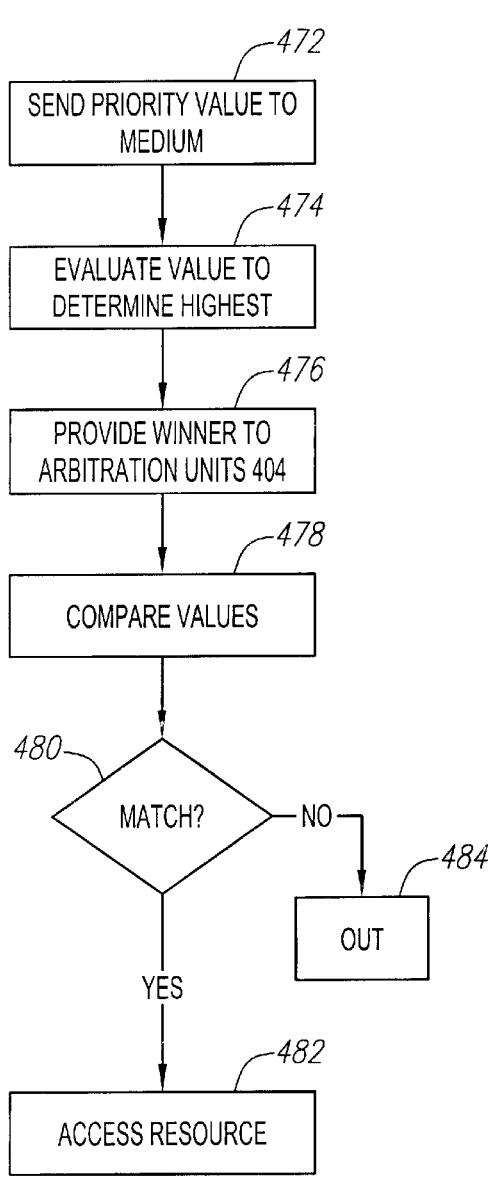
FIG. 15 is an operational flow diagram illustrating a process for performing self-arbiting according to one embodiment of the invention.

FIG. 15 is an operational flow diagram illustrating a process for performing self-arbiting according to one embodiment of the invention. In a step 472, each arbitration unit 404 wishing to access bus 408 sends a priority value 410 to bus 408. The priority values from each arbitration unit 404 are compared on bus 408 or in another evaluation medium as illustrated by step 474. In this comparison step 474, the highest value of the various priority values received from the arbitration units 404 is determined. In one embodiment, the comparison is performed one bit at a time, starting with the highest-order bit of each priority value 410. In alternative embodiments, the comparison is performed on the entire priority value at once, rather than one bit at a time.

In a step 476, this determined highest priority value 412 is fed back to each of the requesting arbitration units 404. In embodiments where the comparison is performed one bit at a time, the bits are fed back one at a time. In a step 478, the arbitration units 404 can then do an internal comparison to determine whether the highest priority value 412 received from bus 408 matches its own priority value. If this received highest priority value 412 does match the arbitration unit's own priority value, that arbitration unit was the highest priority unit arbiting for access to bus 408. As such, this arbitration unit 404 grants itself access to bus 408. This is illustrated by steps 480 and 482.

If, on the other hand, the highest value 412 does not match the arbitration unit's own priority value, this means there was another arbitration unit 404 with a higher priority value 410 vying for access to bus 408. As such, this arbitration unit 404 does not grant itself access to bus 408. This is illustrated by steps 480 and 484.

In one embodiment, the priority value 410 is a value determined by processor 400 based on the operations being performed by processor 400. For example, in a multi-processor environment where several processors 400 may each be performing various functions at various times, routines can be implemented whereby each processor 400 determines its own priority for access to the bus or other shared resource based on the particular operations it is performing. For example, in some multi-processor environments, certain operations, or certain types of operations, may be deemed high-priority operations. In such a case, processors performing these high-priority operations may assign themselves a higher priority for access to the bus or other shared resource. Other factors can also be used to determine the priority of a processor such as, for example, an amount of data to be transferred by a processor, the length of time that a processor has been unsuccessfully arbiting for bus access, the amount of time the processor has been performing a given function, or other factors a system designer may deem important or appropriate in determining a relative priority of a given processor.

In one embodiment, the priorities can be assigned and updated on-the-fly as these factors change. For example, where a processor 400 switches to a high-priority task or operation, that processor may increase its own priority level to a higher priority in real-time. Once the high priority operation is complete, the processor can return its priority level to the lower level previously set, or to some other level based on the priority of its new operation. Similarly, where other factors are used to set the priority, as those factors change in real-time, so can the priority of the processor to adequately handle the processor in its current situation. In this manner, priorities can be dynamically assigned and reassigned, to more accurately reflect the importance, priority or other characteristics of the tasks, operations or applications being performed by the processors. As the processors' needs change or the importance or priority of their respective tasks change, the access priorities can also change to allow access to be granted more in accordance with the relative needs of the processors. This embodiment where priorities can be changed on the fly is well suited to embodiments where the processors 400 (or other entities) set their own priorities.

In other alternative embodiments, priorities can be assigned using other techniques, such as, for example, designating particular processors with particular priorities, randomly assigning priorities to processors, assigning priorities on a round-robin type scheme, or other techniques for assigning priorities. In one embodiment, the priority value put out by arbitration unit 404 is strictly a priority for that entity. However, a situation could conceivably arise wherein two or more entities have the same priority level. For example, in embodiments where priorities can be determined by processors 400 based on operations they are performing or other parameters, it is conceivable that two or more competing processors 400 may each assign themselves the same priority level. In this case, it is useful to implement a scheme whereby this "tie" between competing processors can be broken. In one embodiment of the invention, the tie is broken by the processor ID number. That is, each processor 400 is assigned a unique ID. The ID is used to break a tie that would otherwise occur where two processors each place the highest priority onto the bus. In one embodiment, the processor ID is appended to the priority such that the processor ID becomes the low-order bits of the priority value, and the actual processor priority becomes the highest-order bits of this priority value. As such, the processor ID effectively extends the resolution of the priority value and provides a mechanism whereby ties between competing processors 400 can be broken.

As stated above, in one embodiment, the comparison is performed using a wired-OR comparison. For example, in one implementation of this embodiment, each priority value 410 is actually inverted, and the inverted priority value is asserted onto the bus or other evaluation medium. Thus, where the priority value is a '1' the inverted priority value actually asserted is a '0'. Because, in this application, the bus architecture can sink more current to ground (as is the case with most bus architectures) the priority value that asserts a '0' on the bus (inverted '1'), wins the priority contest.

The winning priority value on the bus is again inverted and fed back to the arbitration units 404. The winning priority value which is fed back to arbitration units 404 is compared with the original priority value asserted so that each arbitration unit 404 can determine whether it should grant itself access to the bus.

In one embodiment, values written to designated locations in shared memory can be used to change a processor's priority, the status of the processor's fair bit, or other processor parameters. For example, in a situation where a processor set to a high priority has a bad piece of code, that processor may unnecessarily tie up the bus or shared resource. Should this occur, in this embodiment another processor can, for example, write a value to the designated location in shared memory to change the first processor's priority, fair bit or other parameters.

Figure 16:
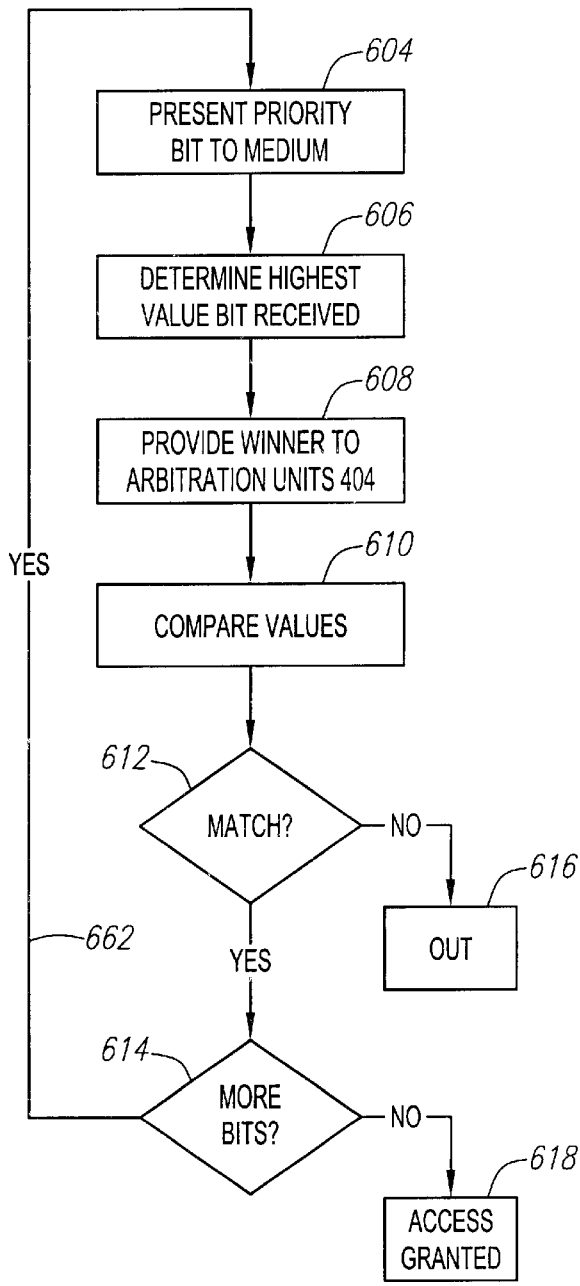
FIG. 16 is an operational flow diagram illustrating the manner in which the priority values are evaluated according to the described example embodiment.

In one embodiment of the invention, the comparison of the priority value is performed one bit at a time for each arbitration unit requesting bus access beginning with the highest order bit. FIG. 16 is an operational flow diagram illustrating the manner in which the priority values are compared according to this example embodiment.

Figure 17:
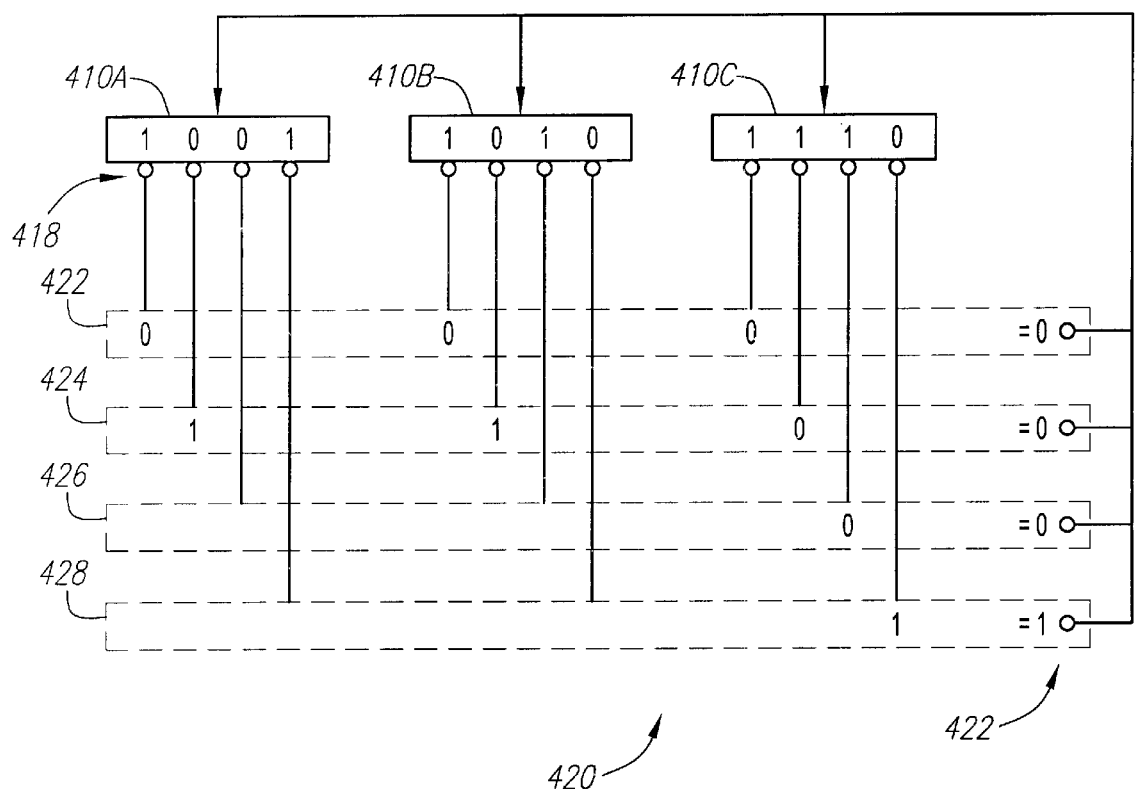
FIG. 17 is a diagram illustrating a simple example where three sample priority values are evaluated to determine which entity is granted access to the shared resource according to one embodiment of the invention.

FIG. 17 is a diagram illustrating a simple example where three sample priority values 410A, 410B, 410C are compared to determine which entity is granted access to the shared resource. Referring now to FIGS. 16 and 17, in a step 604, the first bit of the priority values is presented for evaluation. Specifically, in one embodiment, the highest-order bit of each priority value 410A, 410B, 410C is presented. In the wired-OR embodiments, the bit is inverted before the bit is presented to the wired-OR medium. In one embodiment, the wired-OR medium is bus 408. Bus 408 can be used as the wired-OR medium to reserve resources within the multi-processor system. Alternatively, a separate medium, such as, for example, an auxiliary bus or other comparison medium can be used. In this alternative embodiment, the arbitration can be occurring while data transfers are taking place on the actual bus 408.

In a step 606, this first bit of each priority value 410A, 410B, 410C is evaluated to determine which bit has the highest value. Because the architecture is attempting to determine which priority value is the "highest value," those priority values with the highest-order bit should win this initial priority contest.

An embodiment using a wired-OR configuration, the bits having the '0' value will win the priority contest because any transceiver presenting a '1' to the evaluation medium will not be able to drive the bus "high" if another transceiver is asserting a '0'. This is because all of its current sunk to ground by any transceivers presenting a '0' value bit. Therefore, in the wired-OR embodiments, the bits are inverted before being presented to the evaluation medium 420 such that a '1' becomes a '0', and thus wins the priority contest.

In a step 608, the value of the winning highest-order bit is provided back to the arbitration units. The arbitration units compare this "winning bit" to the bit they submitted for comparison for the priority contest as illustrated by step 610. For each arbitration unit receiving a winning bit that matches the submitted bit, that arbitration unit is still in the running for bus access as illustrated by step 612. If there are additional bits in the priority value that still have not been compared, the operation continues back at step 604 with the next highest-order bit of each priority value 410 of each arbitration unit still in the running is compared. This is illustrated by steps 614, and flowline 662. If there are no more bits to be evaluated and compared, the arbitration unit has access to the resource as illustrated by steps 614 and 618.

If, on the other hand, in a step 610 it is determined that the received "winning bit" does not match the presented bit for one or more of the arbiting entities, these one or more entities are out of the running. This is illustrated by steps 610 and 616. If one or more arbiting entities drops out of the contest, the remaining entities continue vying for access to the bus or other shared resource.

Referring again to the example illustrated in step 17, as discussed above, the highest-order bit of each priority value for 410A, 410B, and 410C were presented to the evaluation medium 420. Because each of these bits happened to be the same in this example, the result of this fist comparison is a tie. Thus, this same value, which is a '1' in this example, is presented back to the arbitration units. The arbitration units compare this '1' to the value they presented which also was a '1' for each case in this example, therefore each arbiting entity is still in the contest.

During the next iteration of the operation, the next-highest-order bit is presented to evaluation medium 420. In the example illustrated in FIG. 17, this is a '0' for priority values 410A, 410B, and a '1' for priority value for 410C. Thus, because priority value 410C is a higher value than priority values 410A, 410B, priority value 410C should win in this comparison contest. Following the process with this example, the '0', and '1' are compared. The '1', being the highest value, wins the contest. For embodiments utilizing a wired-ORcomparison, the values are inverted such that the '1' becomes a '0' by inverters 418. This '0' wins the priority contest in wired-ORembodiments of comparison meeting 420. This winning '0' is inverted by inverters 422 such that a '1' is presented back to the arbiting units for comparison to the bit that was presented for arbitration. Because, in this example, only priority value 410C can make a positive comparison, arbiting units having priority units 410A and 410B now drop out of the contest. Because the arbiting unit having priority value 410C is the only remaining unit, this entity has won the priority contest and is granted access to the bus or other shared resource.

As this example illustrates, the bit-by-bit comparison of the priority values 410 continues until there is one remaining winner. As stated above, the priority value can include a priority number as well as an ID number wherein the ID can be used to break any ties which might arise between competing priority values. In one embodiment, the only entities that contend for access to the bus or other shared resource are those entities that actually have a requirement to utilize the shared resource. Thus, the processor or other entity will either enable or disable its arbiting circuit or arbiting thread or circuit depending on whether it has an actual need to access the shared resource. In one embodiment, circuitry or software is provided to indicate to each entity whether it is the only entity remaining in a priority contest. In this embodiment, the arbitration contest can be halted when a single entity remains. This shortens the arbitration process in circumstances where all but one of the entities drops out before each of the priority value bits are arbited. This embodiment requires a mechanism by which each arbiting entity can be informed of either the status of each other arbiting entity, or whether there are any arbiting entities remaining.

Alternatively, any remaining arbiting entity or entities continues to carry out the arbitration process regardless of whether there are any other arbiting entities remaining. More specifically, even after one and only one arbiting entity remains in a contest, and the other arbiting entities have already dropped out, if there are additional bits in the priority value which might have been run through the evaluation medium, this remaining arbiting entity continues to carry out the arbitration process. Of course, because there are no other arbiting entities competing against this remaining entity, this remaining entity will be the defacto winner. This alternative embodiment does not require that any given arbiting entity by aware of the status of any other arbiting entities in the contest or even whether any other entities are vying for access. Thus, although the arbitration process must proceed to the end regardless of whether all but one of the entities has dropped out at an early stage, it is a somewhat simpler implementation as there is no need to be aware of the status of the other entities. As there is no need for each entity to be aware of the status of the other remaining entities.

Of course, as will be apparent to one of ordinary skill in the art, the arbitration technique described herein can be implemented using hardware, software, or a combination thereof. In one example implementation, the arbitration technique is implemented utilizing programmable array logic (PAL) in combination with conventional bus transceivers. In this embodiment, the evaluation medium 420 is a global bus. As discussed above, this evaluation medium 420 can be the same bus for which the entities are competing or, it can be a separate bus used for the arbitration process and perhaps even for other data transfer applications. FIGS. 18a through 18d are block diagrams illustrating an example implementation of the arbitration scheme utilizing a combination of PALs and bus transceivers. This example implementation is now described in terms of a simple scenario in which two boards ID2, ID4 are vying for access to a global bus 712. In this example implementation, each board has a PAL programmed to carry out the functions of presenting the priority value to the global bus for comparison, and receiving a value of the winning bit for each comparison to determine whether that board is still in the running. In the example scenario presented in FIGS. 18a through 18d, the boards ID4, ID2 have a priority value of 4 and 2, respectively. As such, the board having priority value 4 should prevail against the board having priority value 2 for access to global bus 712.

Figure 19:
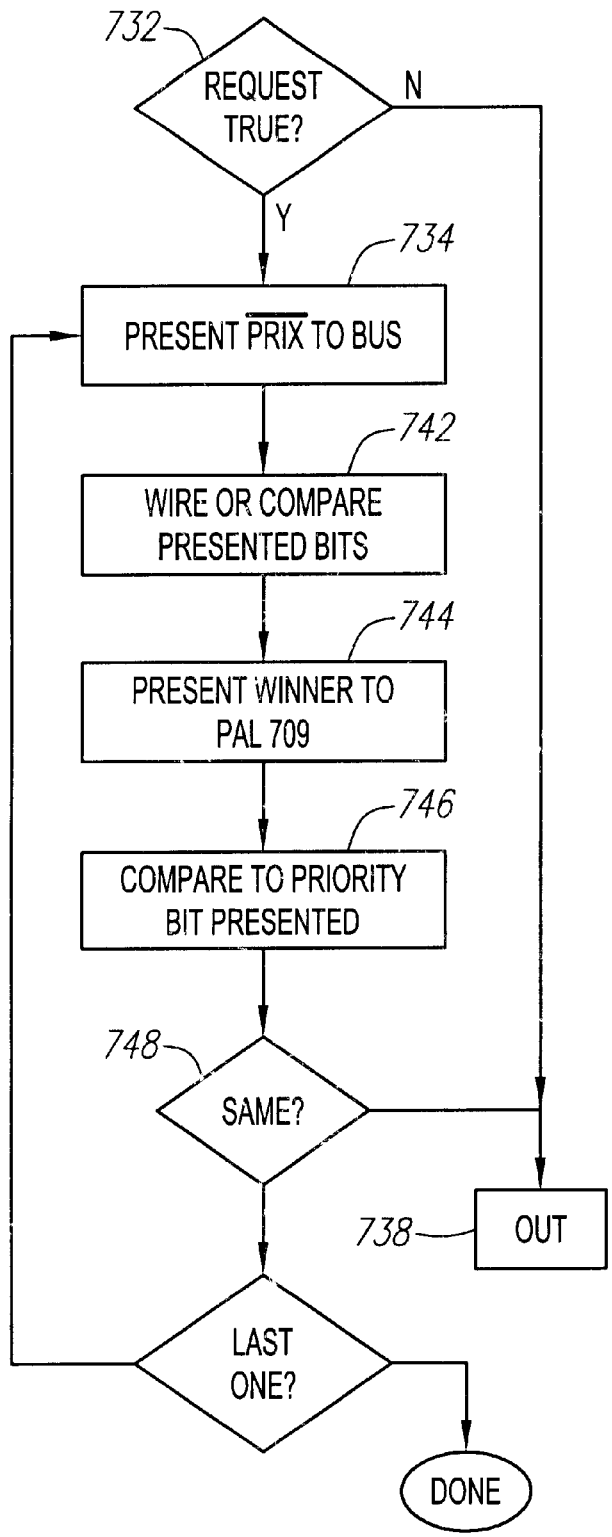
FIG. 19 is an operational flow diagram illustrating s process of vying for access to global bus according to one embodiment of the invention.

The process of these two boards vying for access to global bus 712 is now described in terms of this example implementation. FIG. 19 is an operational flow diagram illustrating this process.

In a step 732, if an entity (in this case a board) wishes to compete for access to global bus 712, that board sets the REQ pin of its PAL true. This enables the PAL to present the priority bits to bus transceiver 709 for comparison on global bus 712. In the example illustrated in FIGS. 18a through 18d, this REQ bit is set true for both boards. That is, both boards are competing for access to global bus 712.

Figure 18A:
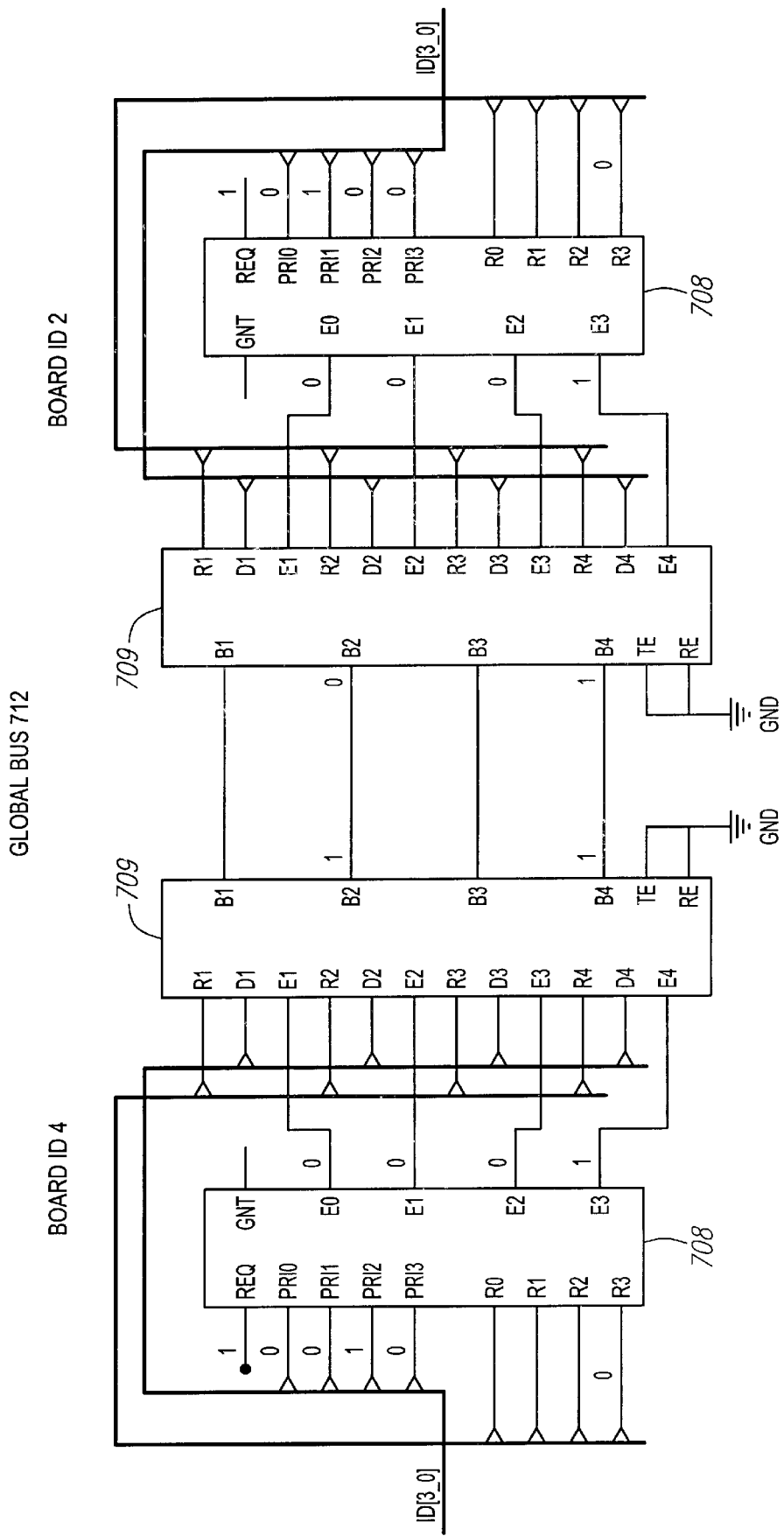
FIGS. 18a through 18d are block diagrams illustrating an example implementation of the arbitration scheme according to one embodiment of the invention.

As illustrated in FIG. 18a, the priority value for boards ID2, ID4 is presented to PALs 708 at bits PRI0, PRI1, PRI2, and PRI3. PRI3 being the highest-order bit and PRI0 being the lowest-order bit. As illustrated in FIG. 18a, board ID4 having an ID value of 4 has the bits 0010 presented at pins PRI0-PRI3. Likewise, board ID2 having a priority value of 2 has bits 0100 presented at pins PRI0-PRI3. This step of providing the priority value to the PAL priority bits is illustrated by step 734 in FIG. 19.

If the request bit is true for a given PAL 708, the highest-order bit of the priority value (i.e., PRI3) is inverted and provided to bus transceiver 709 for presentation on global bus 712. As illustrated in FIG. 18a, PRI3' is presented on global bus 712 for both boards 706. Because PRI3 is a '0' for each board 706, PRI3', which has a value of '1' is presented on global bus 712. Because this is a tie, the '1' remains the value on global bus 712, and this value gets inverted and provided back to PR3 of the PALs 708 for comparison with the original value of PRI3. Because in this case, there was a tie, and a '0' was presented at PRI3 for both PALs 708, the comparison matches for both boards and both boards continue the arbitration process. This step of presenting the inverted bit back to the PAL and comparing it against the original priority bit is illustrated by steps 744 and 746.

Figure 18B:
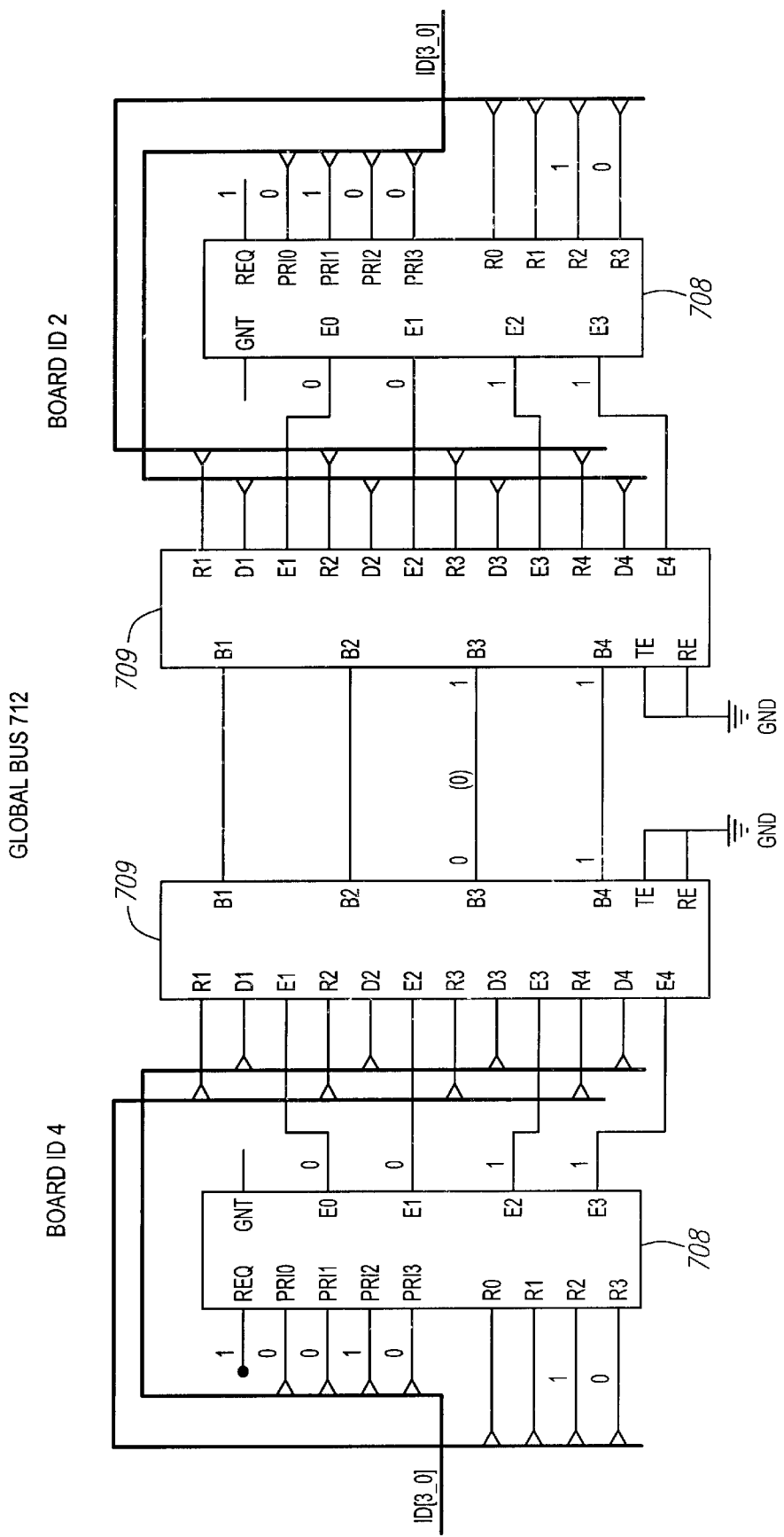
Figure 18C:
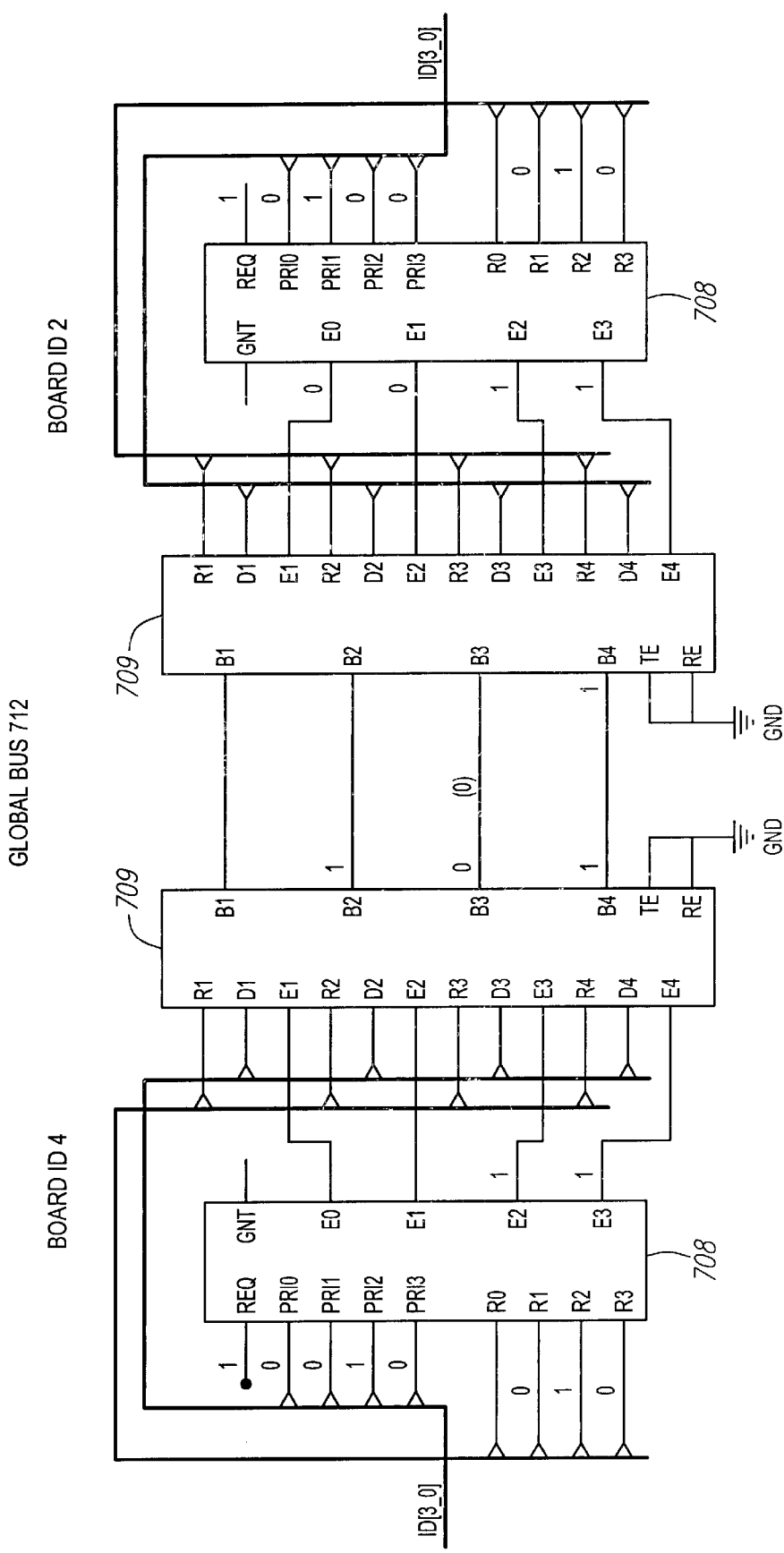
Figure 18D:
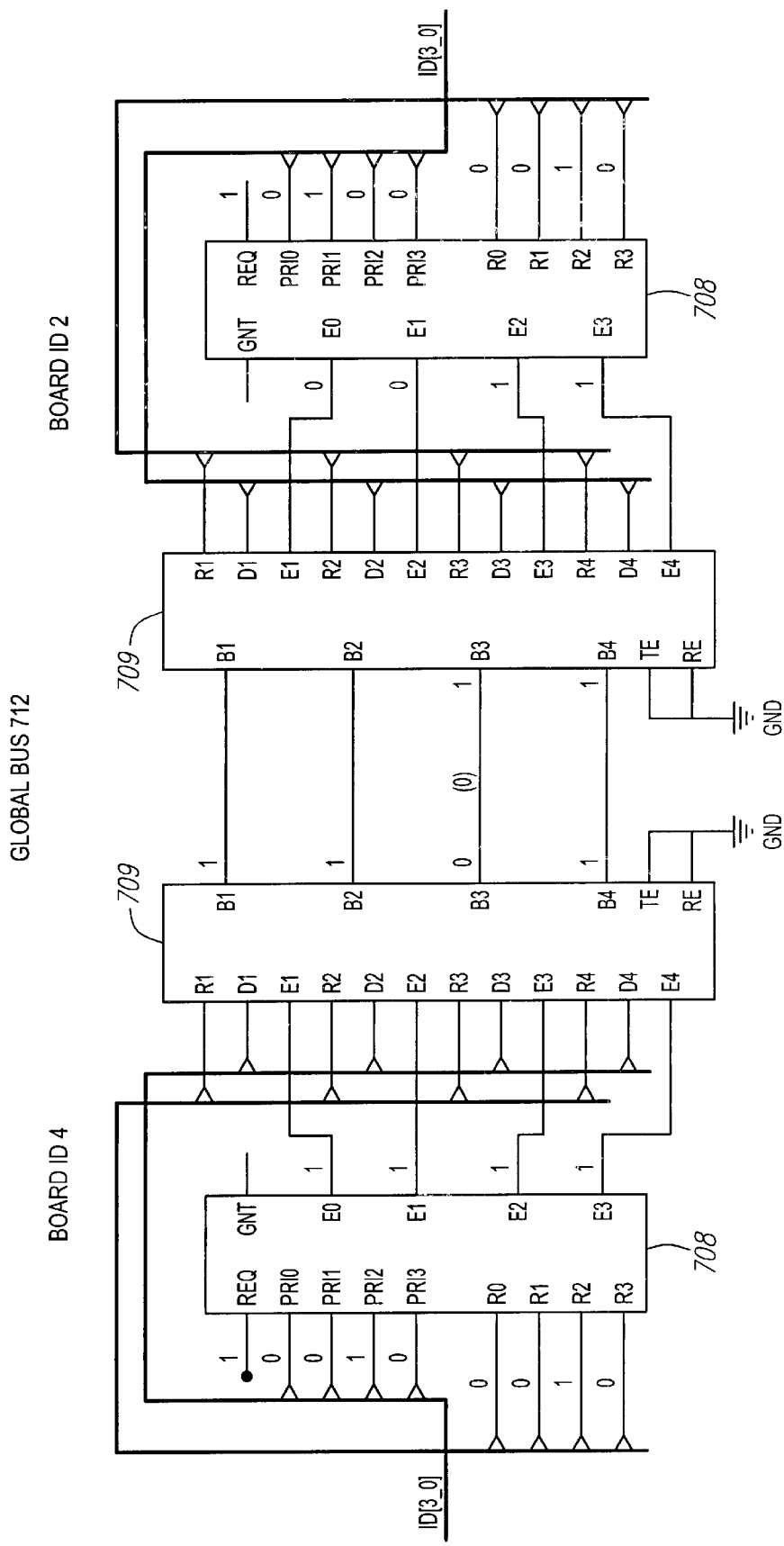

Because the comparison matches, each board is still in the running and the operation continues at step 740 where the next priority bit is inverted and presented to global bus 712. This is illustrated in FIG. 18b where PRI2 is the next-highest-order priority bit to be presented to global bus 712. In this example, board ID4 has a priority bit PRI2 equals '1' while board ID2 has a priority PRI2 equals "0." This results in a '0' (i.e., PRI2') being presented on global bus 712 for board ID4 and a '1' (PRI2') for board ID2. A result of the wired-OR comparison of these two bits in step 742 is a '0' which is inverted in step 744 resulting in a '1' being passed back to PR2 of both PALs 708. This '1' is compared to the value at PRI2 for both PALs in step 746. For the case of board ID2, the comparison does not match in step 748, and therefore board ID2 has lost the priority contest and is out of the running in step 738. Board ID4, however, has a positive comparison and is thus still in the running. In the embodiment illustrated in FIGS. 18a through 18d, the arbitration continues until each bit of the priority value is completely arbited regardless of whether there are any of the remaining boards vying for access. Thus, the process continues in FIG. 18c where bit PRI1 has arbited. As illustrated in FIG. 18c, PRI1, which is a '1' is presented to bus 712 from board ID4. Because board 706B is out of the running, this '1' gets inverted and returned to PRI1 of PAL 708. Because this bit matches the original value of PRI1, board ID4 is still in the running. Likewise, in FIG. 18d, PRI0 is presented to global bus 712 and again, because there is no other bit with which to compete, this value is the automatic winner and it is inverted and presented back to pin PRI0 of PAL 708. As a result of this contest, board ID4 has had a positive comparison for each bit of its priority value. As such, board ID4 has won the priority contest. Thus, in a step 750 PAL 708 for board ID4 sets it GNT pin TRUE taking control of global bus 712.

As would be apparent to one of ordinary skill in the art after reading this example implementation, alternative implementations can be utilized and, similarly, alternative PAL equations can be utilized to achieve the same or similar implementation. For example, in one embodiment of the invention one or more field-programmable gate arrays (FPGAs) are used to implement the arbitration. As would be readily apparent to one of ordinary skill in the are after reading this description, alternative chips or architectures can be utilized. Additionally, as described above, software or combinations of hardware and software can be used to achieve the same or similar results. Additionally, a single chip configuration can be designed and implemented in place of discrete PALs and bus transceiver chips.

In one embodiment, the self-granting, self-arbiting arbitration circuit can be complimented with a "fair bit" concept which allows an arbiting entity to keep control of the shared resource once it has obtained control. That is, if an aribing entity has won access to the shared resource for a given cycle, that entity can set its fair bit false and not allow other entities to access the shared resource during subsequent cycles. Of course, the entity having access can set its fair bit false thus relinquishing access to the shared resource once its it cycle is complete. The cycle for which an entity has access can be deformed as, for example, a bus cycle, a group of two or more bus cycles, or any other period of time as designated by the system designer. Of course, where shared resource is not a bus, the concept of a bus cycle as a unit of time, may not be appropriate. Therefore, other time periods can be defined and utilized.

Figure 20:
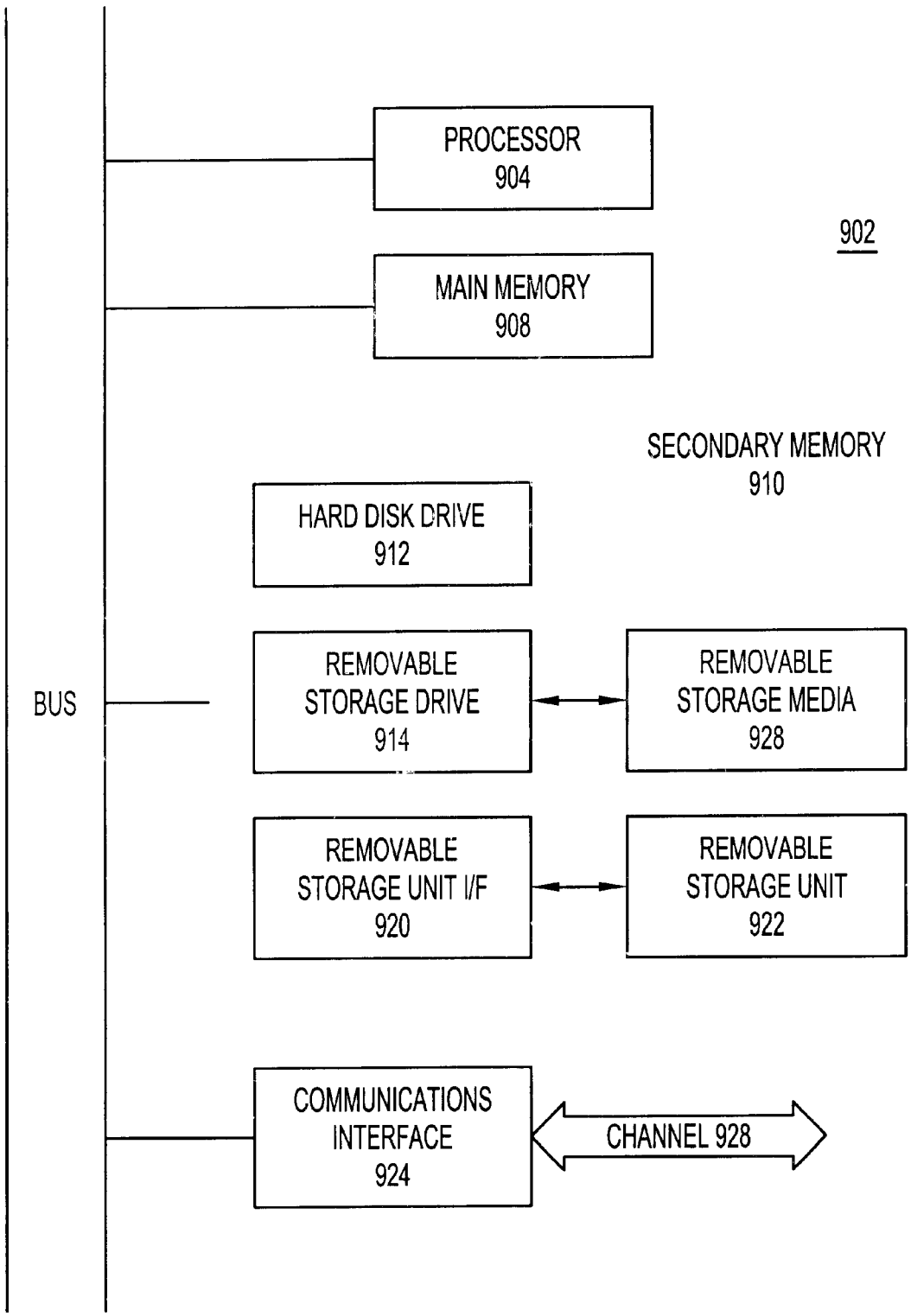
FIG. 20 is a block diagram illustrating an example computing system capable of carrying out the functionality described herein according to one embodiment of the invention.

The various embodiments of the invention described above may be implemented using hardware, software or a combination thereof and may be implemented in a computer system or other processing system. In fact, in one embodiment, these elements are implemented using a computer system capable of carrying out the functionality described with respect thereto. An example computer system 902 is shown in FIG. 20. The computer system 902 includes one or more processors, such as processor 904. The processor 904 is connected to a communication bus 906. Various software embodiments are described in terms of this example computer system. After reading this description, it will become apparent to a person skilled in the relevant art how to implement the invention using other computer systems and/or computer architectures.

Computer system 902 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage medium 918 in a well known manner. Removable storage media 918, represents a floppy disk, magnetic tape, optical disk, etc. which is read by and written to by removable storage drive 914. As will be appreciated, the removable storage media 918 includes a computer usable storage medium having stored therein computer software and/or data.

In alternative embodiments, secondary memory 910 may include other similar means for allowing computer programs or other instructions to be loaded into computer system 902. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 902.

Computer system 902 can also include a communications interface 924. Communications interface 924 allows software and data to be transferred between computer system 902 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals are provided to communications interface via a channel 928. This channel 928 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 918, a hard disk installed in hard disk drive 912, and signals on channel 928. These computer program products are means for providing software to computer system 902.

Computer programs (also called computer control logic) are stored in main memory and/or secondary memory 910. Computer programs can also be received via communications interface 924. Such computer programs, when executed, enable the computer system 902 to perform the features of the present invention as discussed herein. In particular, the computer programs, when executed, enable the processor 904 to perform the features of the present invention. Accordingly, such computer programs represent controllers of the computer system 902.

In an embodiment where the elements are implemented using software, the software may be stored in a computer program product and loaded into computer system 902 using removable storage drive 914, hard drive 912 or communications interface 924. The control logic (software), when executed by the processor 904, causes the processor 904 to perform the functions of the invention as described herein.

In another embodiment, the elements are implemented primarily in hardware using, for example, hardware components such as application specific integrated circuits (ASICs). Implementation of the hardware state machine so as to perform the functions described herein will be apparent to persons skilled in the relevant art(s). In yet another embodiment, elements are implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for providing self-arbitration among a plurality of entities competing for access to one or more shared resources, said method comprising the steps of:
   one or more of said plurality of entities competing for access to the shared resource providing a priority value to a determination medium;
   said determination medium evaluating said provided priority values to determine which of said highest priority values represents a highest priority level, and providing said highest priority value to said one or more of said plurality of entities;
   said one or more of said plurality of entities comparing said received highest priority value with said priority value provided to said evaluation medium; and
   wherein the entity having a positive comparison when comparing its provided priority to said received highest priority value is provided access to said one or more shared resources.

2. The method of claim 1, wherein said plurality of entities comprise at least one of the group of processors, computing systems, and peripheral devices.

3. The method of claim 1, wherein said one or more shared resources comprise at least one of the group of a bus, a memory bus, a shared memory, and a host processor.

4. The method of claim 1, wherein said determination medium is a bus.

5. The method of claim 1, wherein said priority values of said entities comprises an entity priority and an entity ID.

6. The method of claim 1, wherein said step of determining which of said highest priority values represents a highest priority level comprises the step of wire-OR'ing the received priority levels of said one or more entities.

7. The method of claim 1, wherein said step of determining which of said highest priority values represents a highest priority level comprises the steps of:
   inverting the bits of said priority values prior to providing said priority values to said determination medium;
   wire-OR'ing said inverted bits of said priority values at said determination medium; and
   inverting the result of said wire-OR operation.

8. The method of claim 1, wherein said step of determining which of said highest priority values represents a highest priority level is a bit-by-bit comparison, beginning with the highest-order bit of said priority values.

9. The method of claim 1, wherein said steps of providing, determining and comparing comprise the steps of:
   inverting a first bit of each of said priority values;
   providing said inverted first bits to an evaluation medium;
   wire-OR comparing said inverted first bit of said priority values;
   inverting the result of said wire-OR comparison;
   providing said inverted result of said wire-OR comparison to said competing entities; and
   comparing said inverted result of said wire-OR comparison to said first bit of said priority value to determine whether said inverted result and said first bit are the same.

10. The method of claim 4, wherein said bus, is the bus for which said entities are competing.

11. The method of claim 7, wherein said steps of determining are performed one bit at a time.

12. The method of claim 9, further comprising the step of repeating said recited steps for a subsequent bit of said priority value if said comparison of said inverted result and said first bit is positive.

13. The method of claim 11, wherein said wire-OR'ing is performed beginning with the highest-order bit of said priority values.

14. The method of claim 12, further comprising the step of accessing said one or more shared resources when said comparison is true for each bit of said priority value.

15. A computer program media embodying a program of instructions for enabling a computing system having a plurality of entities to perform a method for providing self-arbitration among said plurality of entities competing for access to one or more shared resources, said method comprising the steps of:
   one or more of said plurality of entities competing for access to the shared resource providing a priority value to a determination medium;
   said determination medium evaluating said provided priority values to determine which of said highest priority values represents a highest priority level, and providing said highest priority value to said one or more of said plurality of entities; and
   said one or more of said plurality of entities comparing said received highest priority value with said priority value provided to said evaluation medium; and
   wherein the entity having a positive comparison when comparing its provided priority to said received highest priority value is provided access to said one or more shared resources.

16. The method of claim 15, wherein said plurality of entities comprise at least one of the group of processors, computing systems, and peripheral devices.

17. The method of claim 15, wherein said one or more shared resources comprise at least one of the group of a bus, a memory bus, a shared memory, and a host processor.

18. The method of claim 15, wherein said determination medium is a bus.

19. The method of claim 15, wherein said priority values of said entities comprises an entity priority and an entity ID.

20. The method of claim 15, wherein said step of determining which of said highest priority values represents a highest priority level comprises the step of wire-OR'ing the received priority levels of said one or more entities.

21. The method of claim 15, wherein said step of determining which of said highest priority values represents a highest priority level comprises the steps of:

inverting the bits of said priority values prior to providing said priority values to said determination medium;

wire-OR'ing said inverted bits of said priority values at said determination medium; and inverting the result of said wire-OR operation.

22. The method of claim 15, wherein said step of determining which of said highest priority values represents a highest priority level is a bit-by-bit comparison, beginning with the highest-order bit of said priority values.

23. The method of claim 15, wherein said steps of providing, determining and comparing comprise the steps of:

inverting a first bit of each of said priority values;

providing said inverted first bits to an evaluation medium;

wire-OR comparing said inverted first bit of said priority values;

inverting the result of said wire-OR comparison;

providing said inverted result of said wire-OR comparison to said competing entities; and comparing said inverted result of said wire-OR comparison to said first bit of said priority value to determine whether said inverted result and said first bit are the same.

24. The method of claim 18, wherein said bus, is the bus for which said entities are competing.

25. The method of claim 21, wherein said steps of determining are performed one bit at a time.

26. The method of claim 23, further comprising the step of repeating said recited steps for a subsequent bit of said priority value if said comparison of said inverted result and said first bit is positive.

27. The method of claim 25, wherein said wire-OR'ing is performed beginning with the highest-order bit of said priority values.

28. The method of claim 26, further comprising the step of accessing said one or more shared resources when said comparison is true for each bit of said priority value.

29. A system for providing self-arbitration among a plurality of entities competing for access to one or more shared resources, comprising:

means for providing a priority value to a determination medium from a plurality of entities competing for access to the shared resource;

means for evaluating said provided priority values to determine which of said highest priority values represents a highest priority level, and providing said highest priority value to said one or more of said plurality of entities; and means for comparing said received highest priority value with said priority value provided to said evaluation medium, wherein the entity having a positive comparison when comparing its provided priority to said received highest priority value is provided access to said one or more shared resources.

30. The system of claim 29, wherein said plurality of entities comprise at least one of the group of processors, computing systems, and peripheral devices.

31. The system of claim 29, wherein said one or more shared resources comprise at least one of the group of a bus, a memory bus, a shared memory, and a host processor.

32. The system of claim 29, wherein said determination medium is a bus.

33. The system of claim 29, wherein said priority values of said entities comprises an entity priority and an entity ID.

34. The system of claim 29, wherein said means for determining which of said highest priority values represents a highest priority level comprises the steps of:

means for inverting the bits of said priority values prior to providing said priority values to said determination medium;

means for wire-OR'ing said inverted bits of said priority values at said determination medium; and means for inverting the result of said wire-OR operation.

35. The system of claim 29, wherein said means for determining which of said highest priority values represents a highest priority level performs a bit-by-bit comparison, beginning with the highest-order bit of said priority values.

36. The system of claim 32, wherein said bus, is the bus for which said entities are competing.

37. The system of claim 34, wherein said means for determining performs the determination one bit at a time.

38. An arbitration system, comprising:

a plurality of entities competing for access to a shared resource, said entities having an arbitration unit configured to generate a priority value reflecting a priority for access to said shared resource;

a determination medium, coupled to said plurality of entities and configured to evaluate said priority values from said plurality of entities to determine which of said priority values represents a highest priority level, and further configured to provide said highest priority value to said one or more of said plurality of entities; and wherein said entities are further configured to compare said received highest priority value with said priority value provided to said evaluation medium, and wherein the entity having a positive comparison when comparing its provided priority to said received highest priority value is provided access to said one or more shared resources.

39. An arbitration system for a computing environment having one or more processors competing for access to a shared bus, comprising a plurality of processors, configured to generate a priority value and to provide said priority value to a bus, wherein said bus is configured to wire-OR said priority values and provide the results of said wire-OR back to said processors, and wherein each of said processors are further configured to compare said results of said wire-OR with said priority value to determine whether that said processor has access to the shared bus.

* * * * *